(12) United States Patent
Khan et al.

(10) Patent No.: US 6,807,595 B2
(45) Date of Patent: Oct. 19, 2004

(54) MOBILE COMMUNICATION DEVICE HAVING A PRIORITIZED INTERRUPT CONTROLLER

(75) Inventors: Safi Khan, San Diego, CA (US); Nicholas K. Yu, San Diego, CA (US); Hanfang Pan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 457 days.

(21) Appl. No.: 09/853,333

(22) Filed: May 10, 2001

(65) Prior Publication Data
US 2002/0184423 A1 Dec. 5, 2002

(51) Int. Cl.[7] .............................................. G06F 13/24
(52) U.S. Cl. ...................... 710/260; 710/261; 710/262; 710/263; 710/264
(58) Field of Search ................................ 710/260, 261, 710/262, 263, 264

(56) References Cited

U.S. PATENT DOCUMENTS

| | | | |
|---|---|---|---|
| 5,421,027 A | 5/1995 | Benzel et al. | |
| 5,530,875 A | 6/1996 | Wach | |
| 5,603,035 A | 2/1997 | Erramoun et al. | |
| 6,021,458 A | 2/2000 | Jayakumar et al. | |

FOREIGN PATENT DOCUMENTS

| | | |
|---|---|---|
| EP | 0383474 | 2/1990 |
| EP | 0645690 | 7/1994 |
| GB | 2236880 | 9/1990 |

OTHER PUBLICATIONS

Muller, Mike (1993) ARM6 a high performance low power consumption macrocell. IEEE pp. 80–87.

*Primary Examiner*—Tim Vo
(74) *Attorney, Agent, or Firm*—Philip Wadsworth; Charles D. Brown; Howard H. Seo

(57) ABSTRACT

A microprocessor system having an interrupt controller is provided for use in a mobile communications device. Peripheral processing units generate interrupt requests for sending to the microprocessor. The microprocessor has components for responding to interrupt requests by interrupting current processing and performing an interrupt service routine associated with the interrupt request. The interrupt controller receives interrupt requests directed to the microprocessor from the peripheral processing units and for prioritizes the interrupt requests on behalf of the microprocessor. By providing an interrupt controller for prioritizing interrupt requests on behalf of the microprocessor, the microprocessor therefore need not devote significant internal resources to prioritizing the interrupt request signals.

43 Claims, 14 Drawing Sheets

MOBILE COMMUNICATION DEVICE HAVING A PRIORITIZED INTERRUPT CONTROLLER

BACKGROUND OF THE INVENTION

1. Field of the Invention

The invention relates to mobile communication devices such as wireless telephones configured for use within code division multiple access (CDMA) wireless systems and in particular to microprocessor systems for use therein.

2. Description of the Related Art

CDMA is a wireless communication system for processing voice or data communications. Briefly, with CDMA, digitized voice or data signals are separated into discrete packets and transmitted altogether to achieve optimal overall transmission bandwidth. Upon reception, the packs are reassembled and converted back to voice or data signals. To prepare the voice or data signals for CDMA transmission, a wireless telephone includes various dedicated hardware components for performing CDMA-specific functions. Examples include a digital signal processor (DSP) vocoder for digitizing voice signals, an encoder for encoding the signals for error detection and correction purposes, an interleaver for interleaving portions of encoded signals so as to achieve signal transmission time diversity and thereby reduce transmission power requirements, and a modulator for modulating the interleaved signals for subsequent transmission via a radio antenna. To convert received CDMA signals back into voice or data signals, the wireless telephone includes other dedicated CDMA hardware components such as a CDMA demodulator for de-modulating received radio signals, a de-interleaver for reversing the effect of interleaving, and a CDMA decoder for decoding the encoded signals to thereby extract a voice or data signal.

Within the wireless telephone, the various CDMA receive and transmit components are peripheral components operating under control of a central microprocessor. To perform their various functions, the peripheral components often must have the microprocessor to perform operations on their behalf, such as to transfer data from a central memory system to the peripheral device. If so, the peripheral component transmit an interrupt request signal to the microprocessor specifying a particular operation to be performed by the microprocessor on behalf of the peripheral device. In response to the interrupt request, the microprocessor suspends current microprocessor operations and retrieves and executes a pre-stored interrupt service routine associated with the specific interrupt request. In the case of a data retrieval interrupt request, the interrupt service routine prepares and transmits appropriate memory access signals to the memory system for retrieving the requested data and forwarding the data to the peripheral component issuing the interrupt request. Typically, a different interrupt service routine is stored for each different interrupt request that may be processed by the microprocessor.

The microprocessor periodically scans a plurality of interrupt request lines to detect interrupt requests issued by the peripheral components. Numerous interrupt requests can be received by the microprocessor over the interrupt lines at about the same time. Hence, the microprocessor includes internal components for prioritizing the requests. Microprocessor processes the highest priority interrupt signal first by retrieving and executing the interrupt service routine associated therewith. If an interrupt request having a still higher priority is then received, the microprocessor interrupts the processing of the previous interrupt request to respond to the new higher priority request. With numerous interrupt requests being received by the microprocessor, numerous interrupt service routines may need to be "nested" with the microprocessor to permit all interrupt requests to be processed ultimately. Thus, the microprocessor must not only prioritize interrupt request signals received at the same time bust must also compared the relative priority of newly received interrupt request signals with those of previously received interrupt request signals. In state of the art wireless telephones, wherein numerous peripheral components operate concurrently, numerous interrupt request signals may be received by the microprocessor within each clock cycle and, hence, the microprocessor may need to devote considerable resources to prioritizing signals. Complicated software or hardware may need to be provided, and the costs associated with designing, testing and debugging the hardware or software may add to the overall cost of the wireless telephone. Also, changes to the overall system in which the microprocessor is installed, such as changes in the overall prioritization scheme of interrupt requests within the system, may require that the interrupt request prioritization portions of the microprocessor be modified, further increasing design, debugging, and testing costs for the system. Also, if a complicated prioritization protocol needs to be performed by the microprocessor, there may be a significant delay between receipt of an interrupt request signal and execution of the interrupt service routine corresponding therewith. As a result, overall system performance may be degraded. To compensate, the clock speed of the microprocessor can be increased, but power consumption is thereby also increased, which is particularly undesirable within mobile wireless telephones.

Another problem that arises within many conventional microprocessor which include internal interrupt request prioritization hardware or software, is that considerable microprocessor resources may be required to process various nested interrupt service routines, particularly if interrupt request signals are received one after the other. Briefly, when a new interrupt request signal of high priority is received, the "context" associated with the current processing of the microprocessor is stored in context storage registers. After the new interrupt request has been fully processed, the microprocessor restores to save context and resumes processing the previous interrupt request. The process of restoring the context associated with a previous interrupt service routine is referred to as a "jump" operation. However, within state of the art systems having numerous peripheral components generating numerous interrupt request, the microprocessor may immediately receive a new interrupt request of high priority. As a result, after having just devoted resources to restoring the context associated with a lower priority request, the microprocessor must immediately re-save the context and respond to the new interrupt request. As can be appreciated, considerable processing time either results in still further delays in the initiation of interrupt service routines associated with newly received interrupt requests, or necessitates a still further increase in clock speed of the microprocessor. Hence, either overall system efficiency or overall power consumption of the wireless telephone suffers.

Yet another problem associated with many conventional microprocessors which provide internal interrupt request prioritization software or hardware, is that, to maximize power savings, the microprocessor often needs to switch to a power shut down mode wherein the microprocessor draws either reduced power or no power at all. However, upon receipt of any new interrupt request signal, the microprocessor must power up to determine the priority of the interrupt request and then determine whether the interrupt request needs to be immediately processed or whether the microprocessor can return to the power shut down mode and process the interrupt request later. Thus, even interrupt requests which do not have a sufficiently high priority to justify powering up the microprocessor will nevertheless result in the microprocessor being powered up, at least long enough to access the priority of the received interrupt request. Hence, still further power savings are lost.

Accordingly, it would be highly desirable to provide an improved microprocessor-based system for use within wireless telephones or other mobile communication devices which provides an improved system and method for processing interrupt requests and which, in particular, eliminates the needs for the microprocessor to prioritize the interrupt requests internally. It is to this end that aspects of the invention are primarily directed.

SUMMARY OF THE INVENTION

In accordance with one aspect of the invention, an interrupt controller is provided for use within a microprocessor system of a mobile communications device. Peripheral processing units generate interrupt requests for sending to the microprocessor. The microprocessor has components for responding to interrupt requests by interrupting current processing and performing an interrupt service routine associated with the interrupt request. The interrupt controller receives interrupt requests directed to the microprocessor from the peripheral processing units and for prioritizes the interrupt requests on behalf of the microprocessor.

By providing an interrupt controller for prioritizing interrupt requests on behalf of the microprocessor, the microprocessor therefore need not devote significant internal resources to prioritizing the interrupt request signals. Accordingly, depending upon the specific implementation, either enhanced efficiency or enhanced power savings may be achieved within the microprocessor. Also, be reducing or eliminating the need for the microprocessor to internally prioritize interrupt request signals, the hardware and software of the microprocessor, depending upon the specific implementation, can be simplified, thus reducing design, debug and testing costs associated and also reducing the need to modify the microprocessor in the event of changes to the interrupt request architecture of the overall system in which the microprocessor is embedded.

In an exemplary embodiment, the interrupt controller includes an interrupt source interface unit for receiving requests directed to the microprocessor from the peripheral processing units. An interrupt prioritization unit identifies an interrupt request of highest priority from among the interrupt requests received. A microprocessor notification unit notifies the microprocessor of the interrupt request of highest priority. The interrupt notification unit includes an interrupt staging unit for storing the interrupt request of highest priority; and an interrupt transmission unit for transmitting a notification signal to the microprocessor indicating that a new interrupt request is stored in the interrupt staging unit. The interrupt staging unit is, for example, an interrupt vector register and the notification signal is, for example, an IRQ signal.

Also in the exemplary embodiment, the microprocessor includes an interrupt notification signal reception unit and an interrupt access unit for reading the new interrupt request stored within the interrupt staging unit. A context storage unit saves a current context of the microprocessor. An interrupt stack controller determines whether a current interrupt service routine is being executed and, if so, stores the interrupt request associated therewith in an interrupt stack. An interrupt service routine execution unit retrieves and executes an interrupt service routine associates with the new interrupt request value. The interrupt service routine execution unit also detects completion of the interrupt service routine, determines whether the interrupt staging unit contains yet another new interrupt request and, if so, executes an interrupt service routine associated with the new interrupt request and, if not, retrieves an interrupt request, if any, stored at the top of the interrupt stack and the corresponding context saved in the context storage unit and resumes execution based upon that context.

Additionally, in the exemplary embodiment, the interrupt controller includes an interrupt service routine tracking unit for tracking the priority level associated with the interrupt request, if any, currently being processed by the microprocessor and an interrupt stack tracking unit for tracking the priority level associated with the interrupt request, if any, stored at the top of the interrupt stack of the microprocessor. A control unit controls the interrupt notification unit to store the interrupt request of highest priority received by the interrupt controller in the interrupt staging unit only if the priority level associated therewith is higher than the priority level associated with the interrupt request, if any, stored at the top of the interrupt stack of the microprocessor. The control unit also controls the interrupt transmission unit to transmit the notification signal to the microprocessor only if the priority associated therewith is higher than the priority level associated with the interrupt request, if any, currently being processed by the microprocessor. The interrupt service routine tracking unit detects whether the interrupt staging unit contains an interrupt request when the interrupt access unit of the microprocessor accesses the interrupt staging unit and, if so, resets the highest priority level tracked in the interrupt service routing tracking unit to the highest priority level currently tracked by the interrupt stack tracking unit and, if not, eliminates the highest priority level tracked in the interrupt service routine tracking unit. The interrupt service routine tracking unit detects whether the interrupt staging unit contains an interrupt request when the interrupt access unit accesses the interrupt staging unit and, if so, resets the highest priority level tracked in the interrupt service routine tracking unit to the priority level of the interrupt request stored in the interrupt request storage unit and, if not, eliminates the highest priority level tracked in the interrupt service routine tracking unit.

Within the exemplary embodiment, by tracking the status of the interrupt stack of the microprocessor within the interrupt controller and also by tracking the status of interrupt service routines being processed by the microprocessor within the interrupt controller, the interrupt controller is able to forward interrupt request to the microprocessor in such a manner to minimize the number of jump operations and therefore the amount of context switching that needs to be performed by the microprocessor. Hence, depending upon the specific implementation, still further efficiency enhancement or power savings may be achieved within the microprocessor.

Method and apparatus embodiments of the invention are provided. Numerous other advantages to the invention and is various embodiments will either be described below or will be apparent from the detailed descriptions in combination with the accompanying drawings.

DETAILED DESCRIPTION OF THE DRAWINGS

DETAILED DESCRIPTION OF THE EXEMPLARY EMBODIMENT

With reference to the figures, preferred and exemplary embodiments of the invention will now be described. The invention will primarily be described with reference to an interrupt controller for use within a voice and data ASIC of a CDMA wireless telephone. However, the principles of the invention are applicable to other systems as well.

Figure 1:
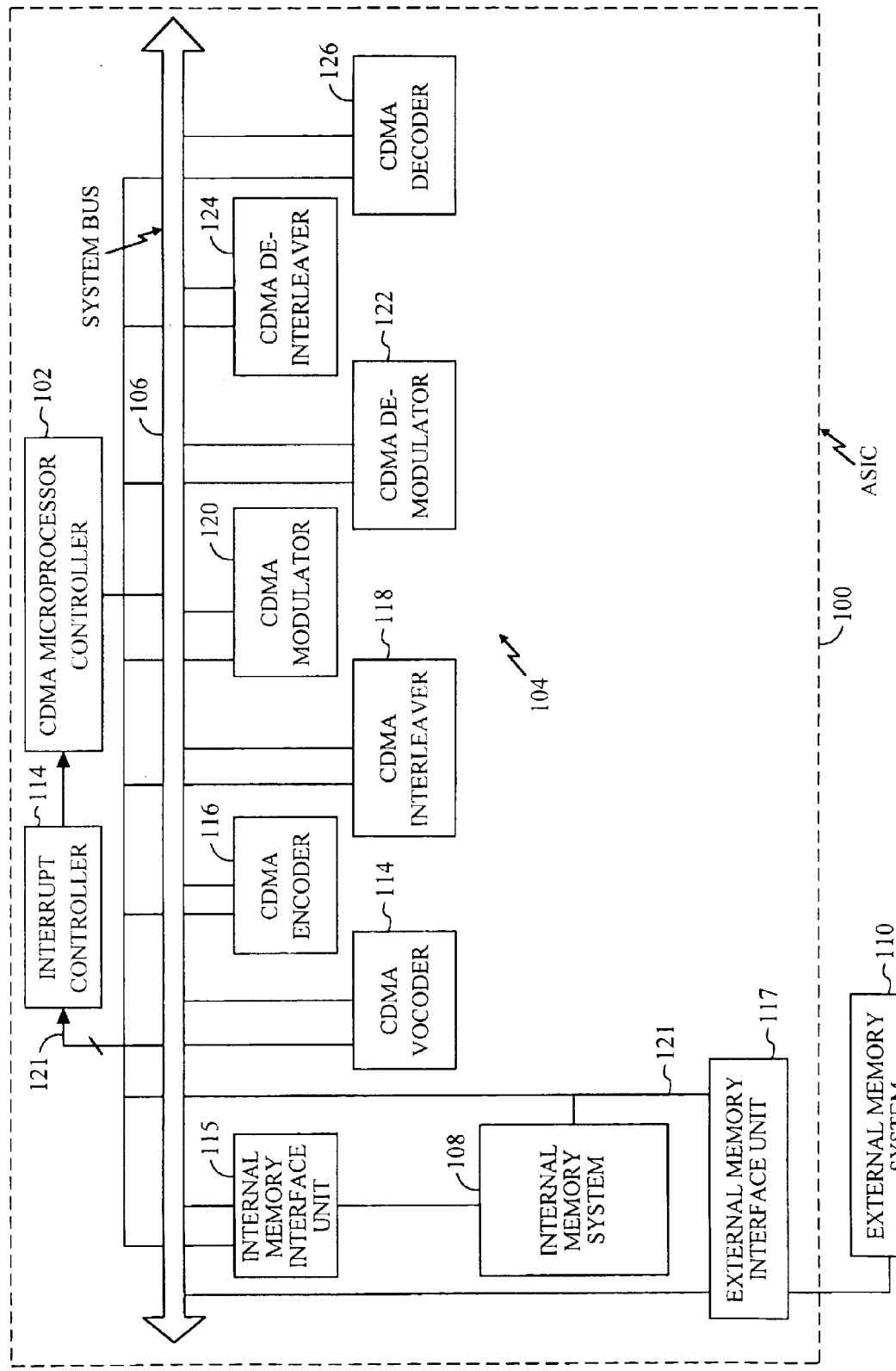
FIG. 1 is a block diagram of pertinent components of an ASIC having an interrupt controller configured in accordance with an exemplary embodiment of the invention for use within a mobile wireless communications device.

FIG. 1 illustrates a voice and data ASIC 100 for use within a mobile wireless communications device such as a wireless telephone configured for use within a CDMA wireless communication system. The voice and data ASIC includes circuitry for handling telephony functions of the wireless telephone. Although not shown, the wireless telephone may include other ASIC's or other integrated circuits configured to perform other functions. For example, if the wireless telephone is configured as a smart phone to provide PDA functions as well as wireless telephone functions, a separated ASIC may be provided for controlling the PDA functions. Alternatively, all functions may be integrated within a single ASIC.

To handle the wireless telephony functions of the wireless telephone, ASIC includes a microprocessor 102 for controlling the voice and data ASIC functions. The microprocessor may be, for example, a reduced instruction set computing (RISC) microprocessor, such as the ARM 7TDMI™ microprocessor provided by Arm, Inc™. ARM 7TDMI and Arm, Inc. are both trademarks of Arm, Inc. In other implementations, other microprocessors are employed including, for example, complex instruction set computing (CISC) microprocessors. Various peripheral components, generally denoted 104, are provided within the ASIC for performing specific CDMA wireless telephony functions.

A system bus 106 interconnects the microprocessor and the various CDMA peripheral components. In use, the microprocessor controls the various CDMA peripheral components, via the system bus, to perform various functions directed to processing CDMA wireless communications such as converting CDMA signals received from a base station (not shown) into voice signals for outputting through a speaker of the wireless telephone or converting voice signals received from a microphone of the wireless telephone into CDMA signals for transmission to the base station. To perform these and other functions, the microprocessor and the peripheral components store data or other information within either an internal memory system 108 formed on the ASIC or within an external memory system 110, which may comprise one or more SRAM, DRAM or flash memory chips mounted within the wireless telephone external to the ASIC. In general, data or other information that needs to be accessed quickly, such as data used in connection with real time processing of telephone calls and the like, is stored within the internal memory system for expedient access. Data that does not need to be retrieved as quickly, such as data for use with non-real time functions, is stored within the external memory system. An internal memory interface unit 115 interconnects the internal memory system with the microprocessor and the peripheral CDMA components via system bus 106. An external memory interface unit 117 interconnects the external memory system with the microprocessor and the peripheral CDMA components also via system bus 106.

ASIC 100 also includes an interrupt controller 119 which prioritizes the interrupt requests sent by the peripheral components on behalf of the microprocessor, then forwards the prioritized interrupt requests, one at a time, to the microprocessor. To this end, the interrupt controller is connected via interrupt lines 121 to each of the peripheral components and memory interface units. In an exemplary embodiment to be described in greater detail below, forty interrupt lines are connected into an input of the interrupt controller.

By prioritizing interrupt requests on behalf of the microprocessor, the complexity of the hardware and software of the microprocessor is correspondingly reduced permitting more efficient design, test and debugging of the microprocessor. System modifications affecting interrupt request signals, such as the addition of new peripheral components having new interrupt request lines, can be accommodated merely by modifying or replacing the interrupt controller, without requiring modifications to the microprocessor itself. Also, as will be described in greater detail below, the interrupt controller routes interrupt signals to the microprocessor in such a way to minimize the amount of context switching required by the microprocessor. By reducing the amount of context switching performed by the microprocessor, the microprocessor is thereby more efficient permitting the microprocessor to perform more instructions during a given period of time or permitting the microprocessor to be run at a reduced clock rate while still performing the same number of operations per given period of time and thereby saving power.

Additionally, the interrupt controller, upon receiving an interrupt request, determines whether the microprocessor is in a power shut down mode and, if so, whether the interrupt request is of sufficient priority to justify powering up the microprocessor. If so, the interrupt controller forwards appropriate signals to the microprocessor for powering up the microprocessor so that the microprocessor can process and respond the interrupt request. If not, the interrupt controller merely stores the interrupt request pending a subsequent power up operation by the microprocessor. In this manner, improved power savings are achieved by permitting the microprocessor to remain in a power shut down mode for a longer period of time. As can be appreciated, without the interrupt controller, the microprocessor would likely need to power up in response to every interrupt request, regardless of the priority of the request. The many other advantages are achieved by the interrupt controller as well.

Now briefly considering the CDMA peripheral components of ASIC 100 which transmit interrupt requests to the microprocessor, for transmission of signals, a vocoder 114 is provided, which may be configured as a DSP, for converting voice signals it receives through a microphone (not shown) into digitized symbols or other packets of information. One example of a vocoder is described in U.S. Pat. No. 5,414,796. A CDMA encoder 116 encodes the symbols generated by the vocoder for error correction and detection purposes. An example encoder is a trellis encoder described in U.S. Pat. No. 5,848,102. A CDMA interleaver 118 interleaves the encoded signals to provide time diversity to thereby permit a reduction in transmission power. An exemplary interleaver is described within U.S. Pat. No. 5,633,881. A CDMA modulator 120 modulates the interleaved signals for subsequent transmission via an antenna (not shown). An implementation of a CDMA modulator is described in U.S. Pat. Nos. 5,103,459 and 4,901,307. For processing received signals, a CDMA demodulator 122 demodulates the signals, a deinterleaver 124 deinterleaves the signals so as to remove the effect of any previous interleaving, and a CDMA decoder 126 decodes signals to extract voice or data signals encoded therein. An exemplary demodulator is described within U.S. Pat. No. 5,602,833. An exemplary deinterleaver is described within the aforementioned U.S. Pat. No. 5,633,881. An exemplary decoder is provided within the aforementioned U.S. Pat. No. 5,848,102. Another exemplary decoder is provided within U.S. Pat. No. 5,710,784. Each of the aforementioned patents are incorporated by reference herein at least for the purposes of providing information pertinent to the functions performed by the various CDMA peripheral components. For voice communications, the decoded voice signals are output through a speaker (not shown) to the user of the telephone. For data communications, the decoded data signals are further processed by other components of the phone such as, for example, for display (on a display not shown) using a web browser program, email program or the like.

Figure 2:
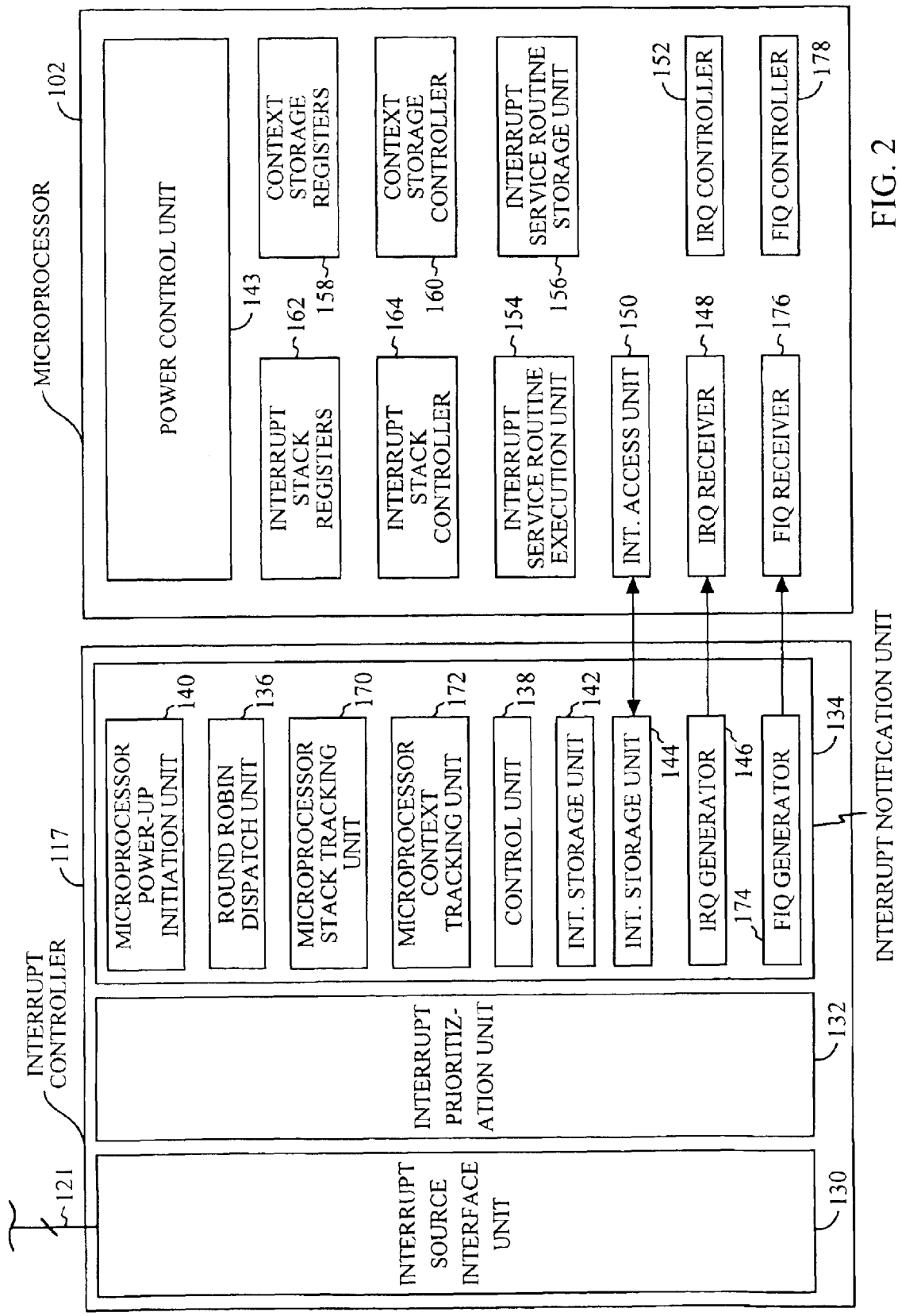
FIG. 2 is a block diagram of pertinent components of the microprocessor and interrupt controller of the system of FIG. 1.

Pertinent components of the interrupt controller for receiving and prioritizing interrupt requests on behalf of the microprocessor and pertinent components of the microprocessor for processing the interrupt requests will now be described with reference to FIG. 2. Interrupt requests from the various peripheral components are received over interrupt lines 121 by an interrupt source interface unit 130 of the interrupt controller. The interrupt requests are then forwarded to an interrupt prioritization unit 132 which prioritizes the requests in accordance with a predetermined prioritization protocol. In an exemplary embodiment to be described below, prioritization is achieved by assigning a priority level to each input interrupt line during system initialization. For example, interrupt source line #1 is assigned a priority level of three. Whereas, interrupt source line #2 is assigned a priority level of one, with the higher priority level being indicative of a higher priority. Other prioritization protocols, however, may be employed. The preferred design is flexible and software programmable.

The interrupt requests, along with their relative priority levels, are then forwarded to an interrupt notification unit 134 which processes the interrupt requests to determine whether the microprocessor should be immediately notified of the interrupt request of highest priority. If two or more interrupt requests share the highest priority, notification unit 134 employs a round-robin dispatch unit 136 to select one of the interrupt requests of equal priority for processing first. Other techniques or protocols for selecting among interrupt requests of equal priority may alternatively by employed. In any case, the interrupt notification unit identifies a single interrupt request for processing next. All other interrupt requests are stored within a pending interrupt request storage unit 142 for subsequent processing. Under the control of a control unit 138, the notification unit then determines whether the microprocessor is currently in a power shutdown mode. If so, the control unit determines whether the interrupt request is of sufficiently high priority to justify powering up the microprocessor. If so, the control unit activates a microprocessor power up initiation unit 140 which forwards appropriate signals to the microprocessor for powering up the microprocessor via a power control unit 143 of the microprocessor. The power up signals may be forwarded over IRQ or FRQ lines, to be described below, or may be transmitted via dedicated power-up lines, not separately shown. If the selected interrupt request is not authorized to trigger a power up operation of the microprocessor, then the selected interrupt request, and all other interrupt requests, are stored within storage unit 142 for subsequent processing after the microprocessor has eventually been powered up, perhaps following receipt of a subsequent interrupt request of still higher priority. A determination of whether a particular interrupt request is authorized to trigger a power up operation of the microprocessor may be performed, for example, by examining the priority level of the interrupt request. For example, only interrupt requests having a priority level of five or higher may be designated as being of sufficiently high priority to authorize powering up of the microprocessor; whereas interrupt requests having lower priority levels are not authorized to power up the microprocessor. As can be appreciated, though, other methods or protocols may be employed for determining whether a pending interrupt request should trigger a power up operation of the microprocessor. In the following, it will be assumed that the microprocessor already has been powered up.

Having identified a single interrupt request for forwarding to the microprocessor, the interrupt notification unit next determines whether the microprocessor should immediately be notified of the interrupt request or whether notification should be deferred pending completion of processing of any previously forwarded interrupt requests. The manner by which the interrupt notification unit makes this determination will now be described with reference to an example wherein several interrupt requests are received by the interrupt controller one at a time. Upon receipt of a first interrupt request, regardless of its priority, the interrupt notification unit stores the interrupt request in an interrupt staging unit 144 then triggers an IRQ generator 146 to transmit an IRQ signal to the microprocessor, which receives the signal via an IRQ receiver 148. In response thereto, the microprocessor reads the interrupt request stored within the interrupt staging unit using an interrupt access unit 150 under control of an IRQ controller 152. Upon receiving the interrupt request, an interrupt service routine execution unit 154 of the microprocessor retrieves a prestored interrupt service routine associated with the interrupt request from an interrupt service routine storage unit 156, then executes the interrupt service routine. Depending upon the interrupt request received, the interrupt service routine may require, for example, the microprocessor to transfer data from external memory to internal memory, or vice versa. As another example, the interrupt request may require the microprocessor to read keypad inputs entered by a user of the mobile telephone via a keypad (not shown). Numerous different interrupt service routines may be stored within storage unit 156 for execution by the microprocessor. No attempt is made herein to list all possible interrupt service routines.

Thus, the microprocessor interrupts its normal processing and instead executes the interrupt service routine. To permit the microprocessor to resume normal processing upon completion of the interrupt service routine, the microprocessor stores the context of the microprocessor within context storage registers 158 under control of a context storage controller 160. The specific values of the microprocessor which define the current context of the microprocessor vary from processor to processor and may vary depending upon the specific operations being performed by the microprocessor immediately priori to receipt of the interrupt. Typically, though, the context of the microprocessor is defined by the values maintained by the microprocessor within various internal execution registers. In any case, the context is saved by retrieving the values stored within those registers and storing the values in context storage registers 158. Thereafter, to restore the previous context, the values within the context storage registers are transferred back into the execution registers. The manner by which the microprocessor saves and restores the context of the microprocessor may be performed entirely in accordance with conventional techniques, which will not be described further herein.

Assuming that no additional interrupt requests are received while the interrupt service routine is executed then, upon completion of the interrupt service routine, the microprocessor restores the previous context based upon the values stored within the context storage registers. Then, when a second interrupt request is received, the interrupt controller stores the second interrupt request in the interrupt staging unit and forwards an IRQ to the microprocessor, which retrieves and processes the interrupt service routine of the second interrupt request.

If, however, the second interrupt request is received while the microprocessor is processing the first interrupt request and the second interrupt request is of higher priority than the first interrupt request, then the interrupt controller stores the second interrupt request in the interrupt staging unit and immediately forwards an IRQ to the microprocessor. In response, the microprocessor saves the context of the interrupt service routine associated with the first interrupt request, then retrieves and processes the interrupt service routine associated with the second interrupt request. Also, along with storing the context associated with the first interrupt service routine, the microprocessor also stores the first interrupt request itself within an interrupt stack 162 under the control of an interrupt stack controller 164. This permits the microprocessor to eventually retrieve the previous interrupt request and its context and resume processing thereof. As can be appreciated, if numerous interrupt requests of increasing priority levels are received, then numerous interrupt requests are stored in the stack and numerous contexts are stored in the context storage register., i.e., the lower priority interrupt service routines are nested within the microprocessor. Ultimately, each interrupt request is read from the stack, its context retrieved, and processing resumed, until all interrupts are fully processed, after which normal processing resumes.

Thus, if a new interrupt request is received by the interrupt controller while the microprocessor is processing an interrupt request of lower priority, the microprocessor is controlled by the interrupt controller to process the new interrupt request immediately. If a new interrupt request is received by the interrupt controller while the microprocessor is processing an interrupt request of equal or higher priority, the new interrupt request is stored in the staging unit but the microprocessor is not immediately notified of the new interrupt request. Upon completion of processing of any particular interrupt request, the microprocessor first examines the interrupt staging unit to determine whether it contains a new interrupt for processing and, if so, the microprocessor retrieves the new interrupt and processes that interrupt, regardless of whether there are pending interrupts within the interrupt stack. If, however, the interrupt staging unit does not contain a new interrupt request, then the microprocessor retrieves the interrupt request at the top of the interrupt stack and continues processing of that interrupt request. Thus, upon completion of an interrupt service routine, the microprocessor automatically processes the interrupt request stored within the interrupt staging unit before processing any interrupt requests pending within its own internal stack. If an IRQ signal is received while an interrupt service routine is being performed, the microprocessor automatically processes the interrupt request associated with the new IRQ signal before processing the interrupt request associated with the current interrupt service routine and before processing any interrupt requests maintained within its internal stack.

To permit the microprocessor to operate in this manner, the interrupt controller tracks the priority level of the interrupt requests stored within the interrupt stack of the microprocessor using a microprocessor stack tracking unit 170. The interrupt controller also tracks the priority level of the interrupt request currently being processed by the microprocessor (i.e., the interrupt request currently "in service") using a microprocessor service tracking unit 172. Whenever the interrupt controller receives a new interrupt request, the interrupt notification unit compares the priority level of the new interrupt request with the highest priority levels tracked by the stack tracking unit and the service tracking unit. If the new interrupt request has a priority level higher than the priority level of the interrupt request currently being serviced by the microprocessor, then the interrupt controller stores the new interrupt request in the interrupt staging unit and sends an IRQ to the microprocessor. If the new interrupt request has a priority level which is less than or equal to the priority level of the current interrupt request being serviced by the microprocessor, but greater than the highest priority level in the interrupt staging unit, but does not immediately forward an IRQ to the microprocessor. This is because if IRQ is asserted, this will cause microprocessor's IRQ receiver to respond and cause microprocessor to save context again, thus hurting performance. Thus, instead, the new interrupt request is merely stored within the interrupt staging unit to permit the microprocessor to access the new interrupt request upon completion of processing of the current interrupt request. If the new interrupt request is of equal or lesser priority to the highest priority level of the interrupt stack of the microprocessor, then the interrupt controller does not store the new interrupt request in the interrupt storage register, and does not send an IRQ to the microprocessor. As a result, upon completion of the current processing, the microprocessor will access the stack and resume processing of the interrupt request at the top of the interrupt stack. Eventually, as interrupt requests stored in the interrupt stack are processed and removed from the stack, the priority level of the new interrupt request will be retrieved and processed by the microprocessor upon completion of its current interrupt service routine. If more than one new interrupt request is received, the interrupt requests of lesser priority are maintained within storage unit 142 of the interrupt notification unit until interrupt requests of higher priority have been retrieved by the microprocessor. As can be appreciated, if the microprocessor currently has numerous interrupt service routines nested therein and if numerous new interrupt requests are received by the interrupt controller, an interrupt request of low priority may be deferred a significant number of clock cycles before it is ultimately forwarded to and processed by the microprocessor. In some cases, the interrupt service routine executed by the microprocessor in response to a higher priority interrupt will require the microprocessor to clear all other pending interrupt requests. If so, then the interrupt requests stored within the interrupt stack and the contexts associated therewith are cleared from the corresponding registers of the microprocessor. Additionally, the microprocessor forwards control signals to the interrupt controller causing the interrupt controller to erase any pending interrupt requests stored therein as well. However, unless such an interrupt reset operation is performed, all interrupt requests received by the interrupt controller ultimately will be forwarded to the microprocessor and processed therein.

The interrupt controller receives interrupt requests at step 200 and stored the requests within internal storage registers. The interrupt controller then identifies the interrupt request of highest priority at step 202. As already noted, a round-robin protocol or other protocol may be employed for selecting among interrupt requests having equal priority. At step 204, the interrupt controller determines whether the microprocessor is currently processing an interrupt request. This determination is made, for example, by accessing information stored by the service tracking unit of the interrupt controller. If the microprocessor is not currently processing an interrupt, then step 206 is performed wherein the interrupt controller transmits an IRQ to the microprocessor. Next, at step 208 the interrupt request selected at step 202 is stored within the interrupt staging unit for subsequent retrieval by the microprocessor. Thereafter execution within the interrupt controller returns to step 200.

If, however, at step 204 the interrupt controller determines that the microprocessor is already processing an interrupt request then at step 210, the interrupt controller determines whether the new interrupt request identified at step 202 has a higher priority than the interrupt request already being processed. If so, then steps 206 and 208 are performed to notify the microprocessor of the new interrupt request. If not, then at step 212 the interrupt controller determines whether the new interrupt request has a higher priority than the priority of the interrupt request at the top of the microprocessor stack. If so, then the new interrupt request is stored within the interrupt staging unit at step 208 permitting the microprocessor to subsequently retrieve the interrupt request upon completion of a current interrupt service routine. If not, then the interrupt controller stores the new interrupt request (and all others) within internal storage registers at step 214 for subsequent processing and returns to step 200.

Within the microprocessor, normal processing at step 216 is suspended upon receipt of an IRQ at step 218. At step 220 the context of the microprocessor is stored. Then, at step 222 the microprocessor reads the interrupt request that had been stored by the interrupt controller at step 208. Beginning at step 224, the microprocessor processes the new interrupt request. During processing, the microprocessor monitors the IRQ input line to detect any new IRQ signals, step 226. If a new IRQ is detected, execution returns to step 218 wherein the new IRQ is received, and the current context is again saved at step 220, with the previous context nested therein. Also, at step 220 the previous interrupt request is stored within the interrupt stack. The new interrupt request is then processed beginning at step 224. If, during the processing of an interrupt request, another IRQ is not detected, the processing of the interrupt request is eventually completed, step 228. Thereafter, at step 230, the microprocessor accesses the interrupt staging unit of the interrupt controller to determine if a new interrupt request had been stored therein at step 208. If, at step 232 the microprocessor determines that an interrupt request had been stored therein, then execution returns to step 222 wherein the new interrupt request is received and processed. If, at step 232 no interrupt requests are found in the interrupt staging unit, then the microprocessor next determines whether there are any interrupt requests remaining in the interrupt stack at step 234. If so, then step 236 is performed wherein the interrupt request at the top of the stack is retrieved, the context associated therewith is restored, and execution returns to step 224 for processing of that interrupt request. If no interrupt requests are remaining in the interrupt stack at step 234, then the microprocessor resumes normal processing at step 238 by retrieving the context associated with normal processing.

Figure 3:
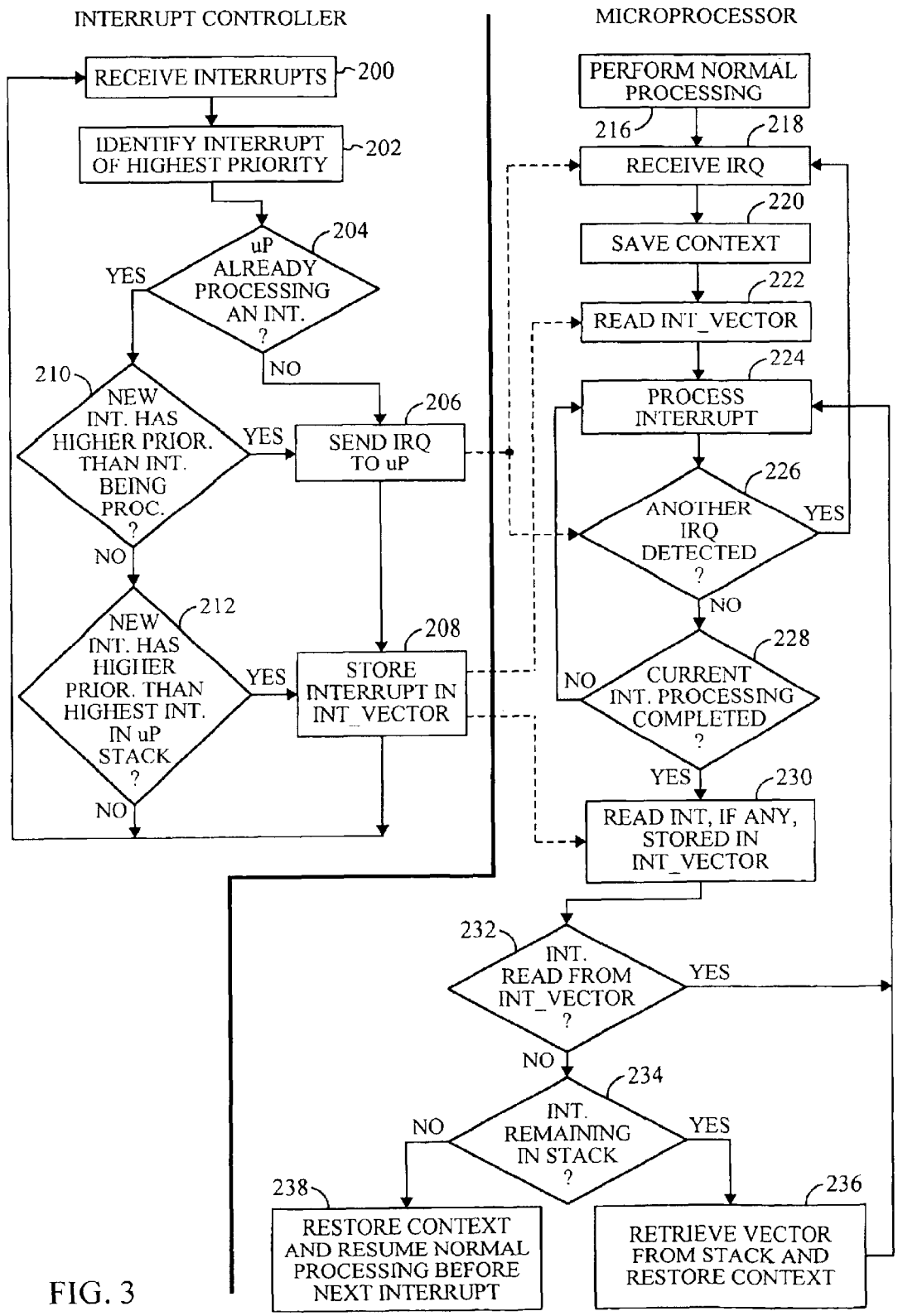
FIG. 3 is a flow chart illustrating a method performed by the microprocessor and interrupt controller of FIG. 2 for use in processing interrupts prioritized by the interrupt controller.

Thus, FIG. 3 summarizes the steps performed by the interrupt controller and the microprocessor in response to receipt of various interrupt request signals. Alternatively, other specific sequences of steps may be performed consistent with the general principles of the invention.

Figure 4:
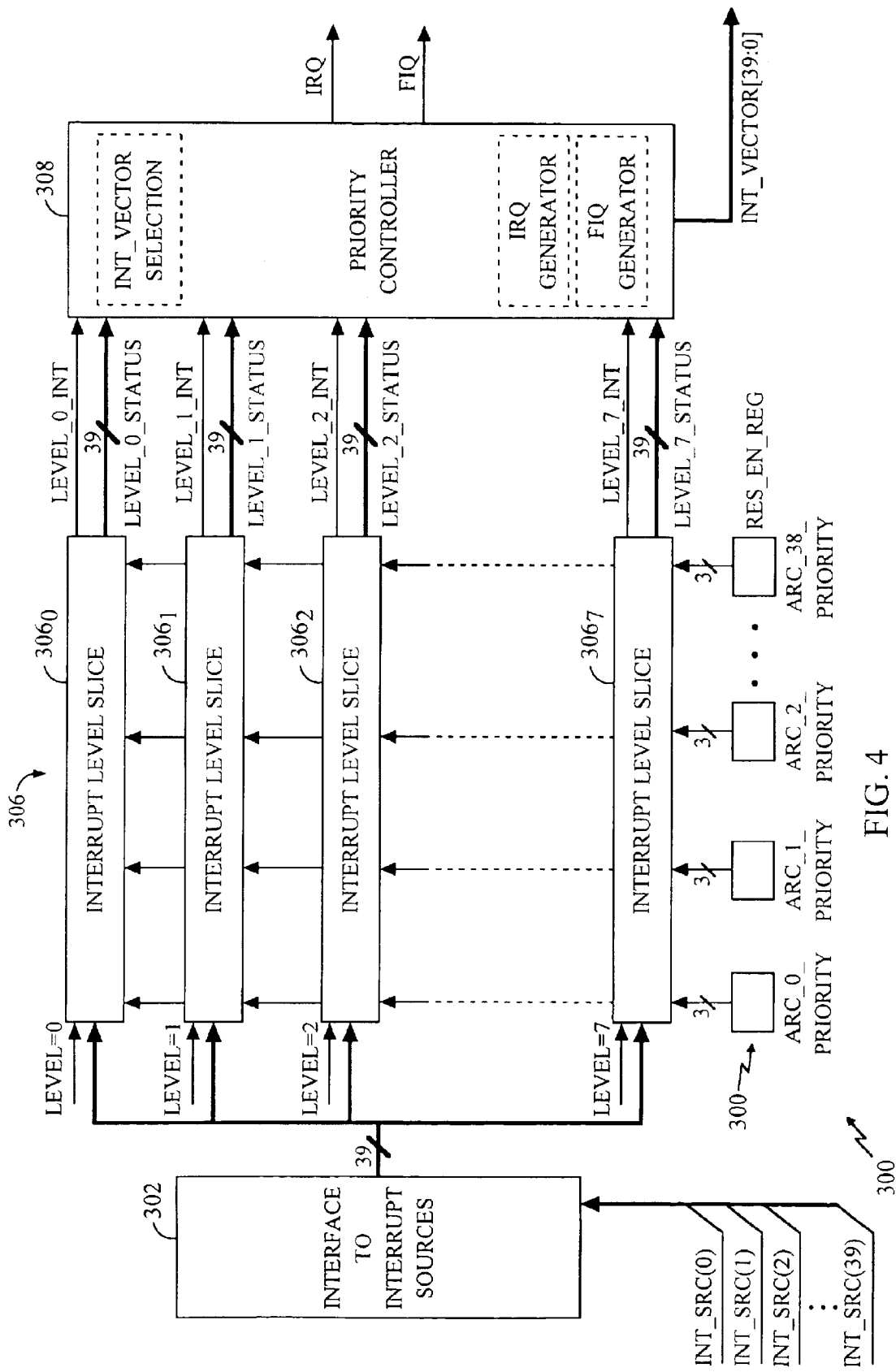
FIG. 4 illustrates an interrupt controller configured in accordance with a specific exemplary embodiment configured to perform the method of FIG. 3.

With reference to the remaining figures, a specific exemplary implementation of the interrupt controller will be described. The interrupt controller operates substantially as described above. Hence, the operations performed by the interrupt controller of the remaining figures will not be described in detail. Rather, only pertinent details of the interrupt controller will be described. As illustrated in FIG. 4, interrupt controller 300 of the specific exemplary system receives interrupt service requests for ISRs via for example forty input lines using an interface to interrupt sources unit 302. The interface to interrupt sources unit outputs a forty-bit vector having one bit associated with each interrupt source line. Each interrupt source line wherein an interrupt signal was asserted is represented within the forty-bit vector by a binary value of one in the corresponding bit location. A set of forty priority level registers 304 identify the priority level associated with each interrupt source line. For example, a total of eight priority levels are accommodated.

A set of eight interrupt level slice units 306 combine the vector received from interface unit 302 with the priority values received from the priority registers 304 to output eight forty-bit vectors, with one vector per priority level, and with each vector identifying only those interrupt signals having the respective priority level. The eight interrupt slice vectors are forwarded to a priority controller 308 which processes the interrupt requests represented within the vectors generally in the manner described above. A round-robin dispatch unit is provided within the priority controller for selecting one interrupt request from among a group of interrupt requests of equal priority.

Among other functions, priority controller 308 determines whether the selected interrupt request of highest priority is to be immediately stored within an interrupt vector for forwarding to the microprocessor and determines whether an IRQ signal is to be immediately transmitted to the microprocessor. If an interrupt service request is to be forwarded to the microprocessor, the selected interrupt request is identified by setting a corresponding bit within a forty-bit output vector (INT_VECTOR). The priority controller also received FIQ interrupt requests and forwards them immediately to the microprocessor. Additionally, the priority controller determines whether the microprocessor is currently within a power down state and, if the selected interrupt request is of sufficiently high priority to justify powering up the microprocessor, the priority controller forwards the appropriate signals (via power up connection lines not shown in FIG. 4) to the microprocessor (also not shown). To determine whether the highest priority interrupt request should be stored immediately within the interrupt vector and to determine whether an IRQ should be transmitted immediately to the microprocessor, the priority controller exploits IN_STACK and IN_SERVICE registers (illustrates in FIG. 8) to track the status of an interrupt stack of the microprocessor and interrupt service routine processing performed by the microprocessor, respectively. The internal components of the priority controller will be described in greater detail with respect to the remaining figures which should be taken in combination with the descriptions provided above of the overall functionality of the interrupt controller of the invention.

Figure 5:
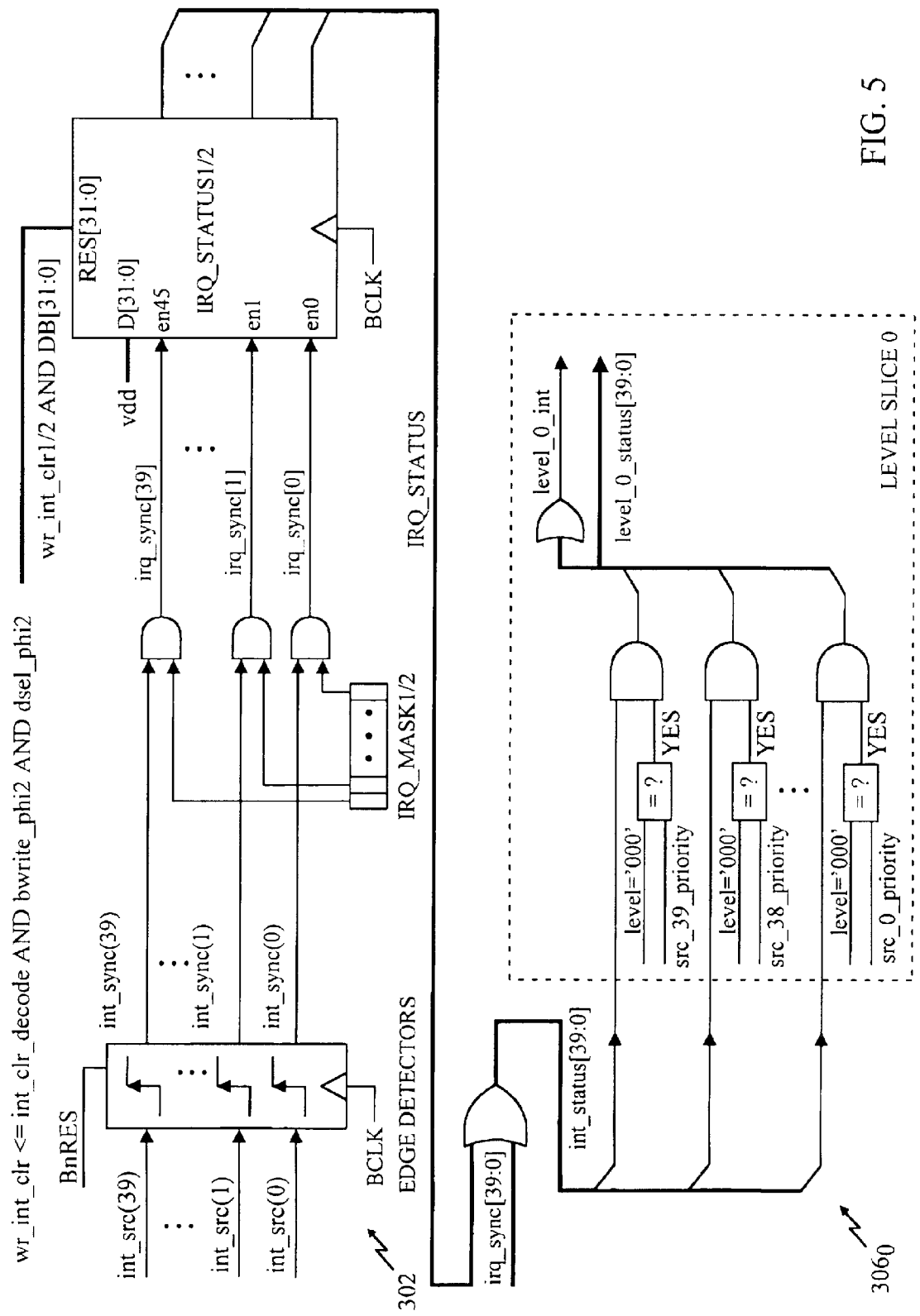
FIG. 5 illustrates pertinent circuit components of the source interface unit and one of the interrupt level slice units of FIG. 4.

FIG. 5 illustrates pertinent circuit components of interface source unit 302 and one of the interrupt level slice units 306. ISRs on the forty input lines (int_src(0) to int_src(39)) synchronized with a BCLK regime (clock signal), and masked by a corresponding bit in a IRQ_MASK register. The input signals are synchronized by forty edge detectors wherein a rising edge of the input signal (irq_sync(0) to irq_sync(39) in FIG. 5) produces a signal that is synchronous to the clock signal BCLK. A series of forty 3-bit priority registers (labeled src_0_priority to src_39_priority in FIG. 4) provide the programmed priority levels associated with each subsystem. Eight interrupt level slices read the forty synchronized ISRs and their corresponding priority levels from the priority register and output a forty bit interrupt status vector (labeled int_status in FIG. 2) of the particular level and the OR of all of its parameter bits. An IRQ_STATUS register records the ISRs from the forty input lines (labeled int_src(0) to int_src(39) in FIG. 4). The synchronized ISRs enable the forty 1-bit registers within the IRQ_STATUS register block when a corresponding ISR signal is present. Each IRQ_STATUS register bit allows for independent synchronous reset when a ISR is fully serviced by the controller or an overriding event occurs which cancels all outstanding ISRs. Interrupt slice $306_0$ compares the programmed 3-bit source priority with '000' and the result is ORed with a corresponding masked IRQ_STATUS bit. A forty bit level vector is generated to indicate the requesting status of the forty sources at each particular priority level. The OR of this vector is also output as the overall interrupt request at each particular priority level. The controller receives the forty bit status vector indicating the requesting sources and is OR from the interrupt slices.

Figure 6:
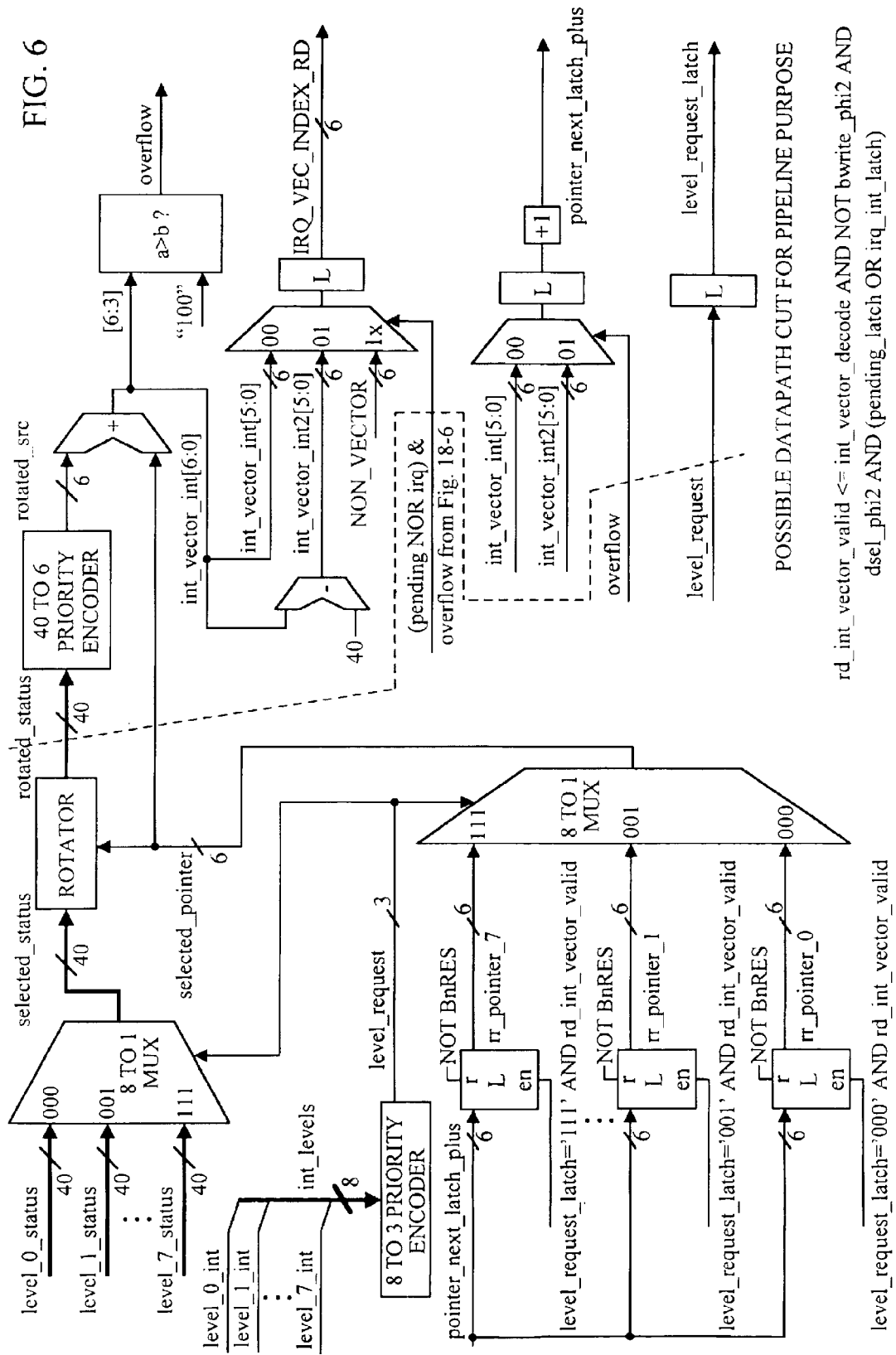
FIG. 6 illustrates pertinent circuit components of round-robin dispatch circuitry within the priority controller of FIG. 4.

FIG. 6 illustrates the round-robin dispatch circuit for the interrupt vector selection and units for the generation of the IRQ/FIQ signals. For sources programmed at the same priority level, the round-robin dispatch scheme is used to assign the priorities among the competing sources. Eight latches (rr_pointer_0 to rr_pointer_7 as labeled in FIG. 6) are used to point to the highest priority subsystem of the different levels. As stated above, the eight priority interrupt levels are encoded as a 3-bit vector (labeled as level_request in FIG. 6) to indicate the highest priority requesting level. The priority level 3-bit vector selects the interrupt status vector (level_0_status to level_7_status) and a corresponding pointer (rr_pointer_0 to rr_pointer_7). The priority level 3-bit vector is also used to qualify the enable pin of specific rr_pointer registers. The round-robin dispatch circuit, preferably a left rotator with a forty to six priority encoder and a six-bit adder, operates on signals corresponding to the priority level and generates a mux selected_status signal. Rotating left by the selected point value ensures that MSB of the rotator output has the highest priority. A priority encoder encodes the rotator output, where a request at MSB is encoded as '000000' and a request at LSB is encoded at '010111'=39. Encoder output is then adjusted through a six-bit adder for the mux select signal. Encoder output is then adjusted through a six-bit adder for the mux select signal. The interrupt vector register latches the encoder output at the next BCLK edge.

Figure 7:
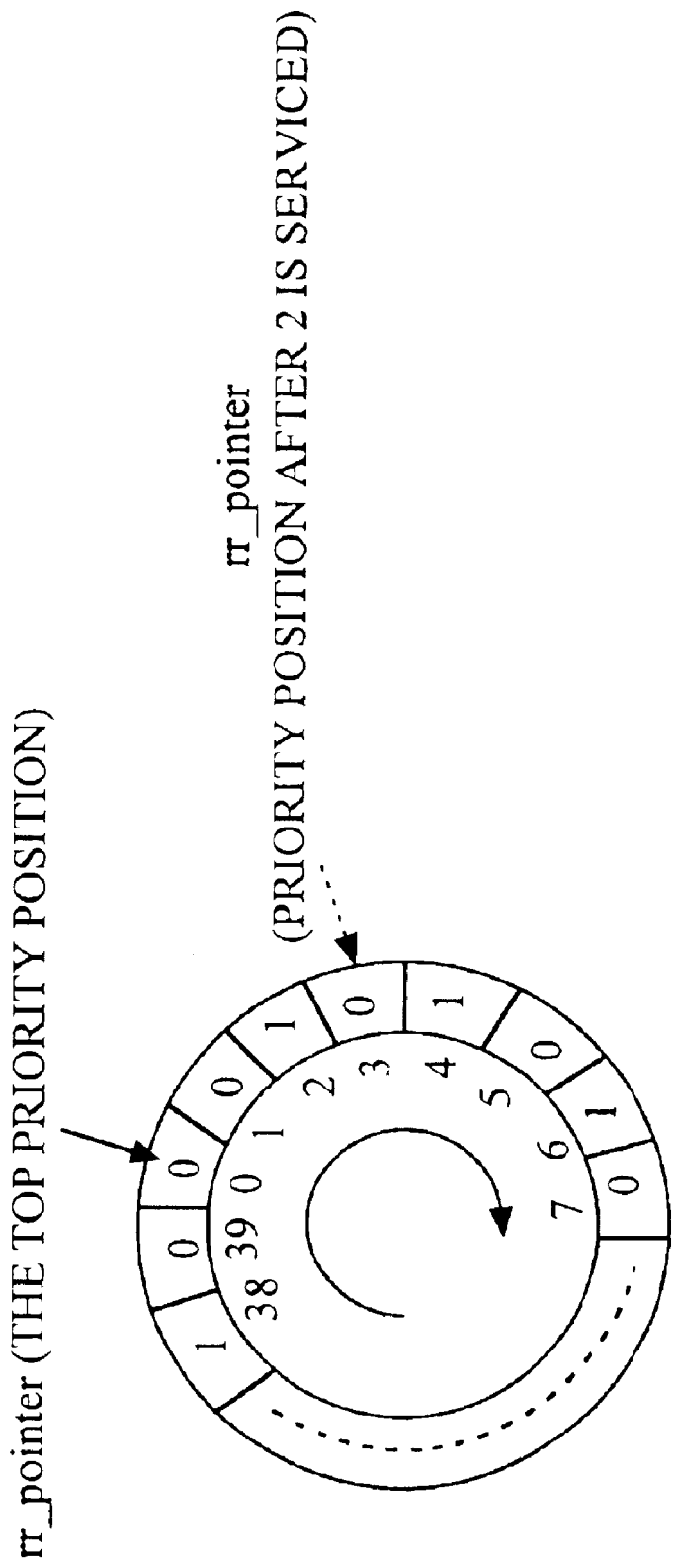
FIG. 7 illustrates round-robin pointers used by the round-robin dispatch circuitry of FIG. 6.

FIG. 7 illustrates an example of the above-described round-robin dispatch scheme. The forty boxes within the double circle represent the forty input lines transmitting the ISRs from the forty subsystems. The outer circle represents the selected_status vector of FIG. 6 which indicates whether an interrupt is currently pending for that particular subsystem. The rr_pointer points to the highest priority pending interrupt. For example, the pointer points to subsystem No. 0 after initialization, and then jumps to source No. 3, which has the highest priority among pending interrupt signals. After subsystem No. 3 is serviced, the pointer is updated so that so that it points to subsystem No. 4 as the next highest priority interrupt of the selected level. The round-robin dispatch scheme further continues with the pointer rotating around the forty subsystems.

Figure 8:
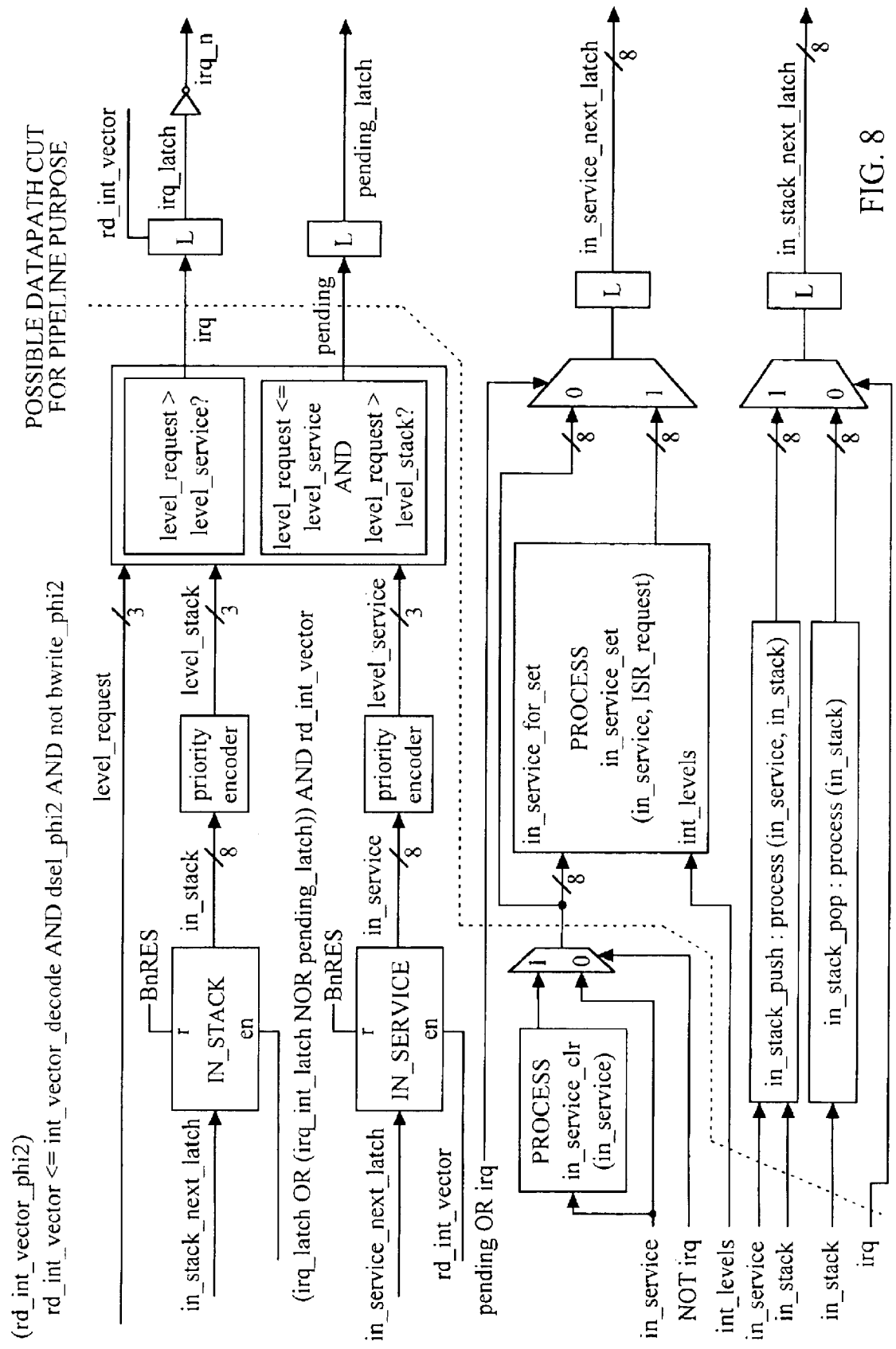
FIG. 8 illustrates pertinent circuit components of an IRQ generator of the priority controller of FIG. 4.

FIG. 8 illustrates the IRQ generator within the priority controller of FIG. 4. A first eight bit flag IN_SERVICE register indicates that nested ISRs are on hold within the microprocessor while ISRs of higher priority are serviced by the microprocessor. Each bit of the IN_SERVICE register indicates whether the corresponding priority level has an ISR nested in the microprocessor. Because multiple ISRs can be nested, multiple bits in the IN_SERVICE register may be in the '1' status. A second eight big flag register IN_STACK indicates the priority levels being pushed into an interrupt stack of the microprocessor. For example, a '1' at bit 5 indicates a priority level 5 ISR has been pushed into the interrupt stack because the microprocessor is busy with an ISR with a priority level higher or equivalent to priority level 5. The combination of the IN_SERVICE flag and the IN_STACK flag eliminates unnecessary context switching cycles. The microprocessor reads the interrupt vector at the end of servicing an ISR to determine if a further ISR is pending, which has a priority lower than or equal to the just-finished ISR and higher than the ISR on the top of the stack. If so, the microprocessor directly jumps to the new interrupt vector location without context restoring. If there are no pending ISRs or an ISR being serviced was interrupted by an ISR of a higher priority level, a special value NON_VECTOR is stored within the interrupt vector at INT_VECTOR.

The NON_VECTOR designation on INT_VECTOR is generated by comparing the highest requesting level with the top level of the stack as represented by IN_STACK. If a requesting ISR which is of a higher level than that on top of the stack (pending='1') is present, the microprocessor executes the higher priority level ISR before it returns. The microprocessor always reads INT_VECTOR when it completes the servicing of an ISR and jumps in the new valid INT_VECTOR location for another ISR until no ISR higher than the top of the stack is pending. At that time, pending='0' and the special value NO_VECTOR is returned at INT_VECTOR. When there is an ISR which has a higher priority level that the highest level in the IN_SERVICE stack register, a irq_int signal is asserted. In FIG. 6, the irq_int signal is the signal before the IRQ latch.

A microprocessor read of the INT_VECTOR register causes the interrupt controller to update the IN_SERVICE flag register by clearing the bit corresponding to the ISR level finished by the microprocessor. The interrupt controller may also set the bit corresponding to the ISR level microprocessor jumps to after reading a valid INT_VECTOR value. An IN_SERVICE_next vector is the output of a combinational logic comprised of a mux and four processing units illustrates in FIG. 8. The processing units perform the instructions set forth in the following table:

TABLE I

```
service_clr_proc: PROCESS (in_service)
BEGIN
    in_service_clr <= in_service;
    IF(in_service(7) = '1') THEN
        in_service_clr(7) <= '0';
    ELSIF(in_service(6) = '1') THEN
        in_service_clr(6) <= '0';
    ELSIF(in_service(5) = '1') THEN
        in_service_clr(5) <= '0';
    ELSIF(in_service(4) = '1') THEN
        in_service_clr(4) <= '0';
    ELSIF(in_service(3) = '1') THEN
        in_service_clr(3) <= '0';
    ELSIF(in_service(2) = '1') THEN
        in_service_clr(2) <= '0';
    ELSIF(in_service(1) = '1') THEN
        in_service_clr(1) <= '0';
    ELSIF(in_service(0) = '1') THEN
        in_service_clr(0) <= '0';
    END IF;
END PROCESS;
service_set_proc: PROCESS(in_service_for_set, int_levels
BEGIN
    in_service_set <= in_service_for_set;
    IF(int_levels(7) = '1') THEN
        in_service_set (7) <= '1';
    ELSIF(int_levels(6) = '1') THEN
        in_service_set (6) <= '1';
    ELSIF(int_levels(5) = '1') THEN
        in_service_set (5) <= '1';
    ELSIF(int_levels(4) = '1') THEN
        in_service_set (4) <= '1';
    ELSIF(int_levels(3) = '1') THEN
        in_service_set (3) <= '1';
    ELSIF(int_levels(2) = '1') THEN
        in_service_set (2) <= '1';
    ELSIF(int_levels(1) = '1') THEN
```

TABLE I-continued

```
        in_service_set (1) <= '1';
    ELSIF(int_levels(0) = '1') THEN
        in_service_set (0) <= '1';
    END IF;
END PROCESS
stack_push_proc: PROCESS(in_service, in_stack)
BEGIN
    in_stack_push <= in_stack
    IF(in_service(6) = '1') THEN
        in_stack_push (7) <= '1';
    ELSIF(in_service(5) = '1') THEN
        in_stack_push (6) <= '1';
    ELSIF(in_service(4) = '1') THEN
        in_stack_push(5) <= '1';
    ELSIF(in_service(3) = '1') THEN
        in_stack_push (4) <= '1';
    ELSIF(in_service(2) = '1') THEN
        in_stack_push (3) <= '1';
    ELSIF(in_service(1) = '1') THEN
        in_stack_push (2) <= '1';
    ELSIF(in_service(0) = '1') THEN
        in_stack_push (1) <= '1';
    ELSE
        in_stack_push (0) <= '1';
    END IF;
END PROCESS;
stack_pop_proc: PROCESS(in_stack)
BEGIN
    in_stack_pop <= in_stack
    IF(in_stack(7) = '1') THEN
        in_stack_pop (7) <= '0';
    ELSIF(in_stack(6) = '1') THEN
        in_stack_pop (6) <= '0';
    ELSIF(in_stack(5) = '1') THEN
        in_stack_pop (5) <= '0';
    ELSIF(in_stack(4) = '1') THEN
        in_stack_pop (4) <= '0';
    ELSIF(in_stack(3) = '1') THEN
        in_stack_pop (3) <= '0';
    ELSIF(in_stack(2) = '1') THEN
        in_stack_pop (2) <= '0';
    ELSIF(in_stack(1) = '1') THEN
        in_stack_pop (1) <= '0';
    ELSIF(in_stack(0) = '1') THEN
        in_stack_pop (0) <= '0';
    ENC IF;
END PROCESS;
```

Figure 9:
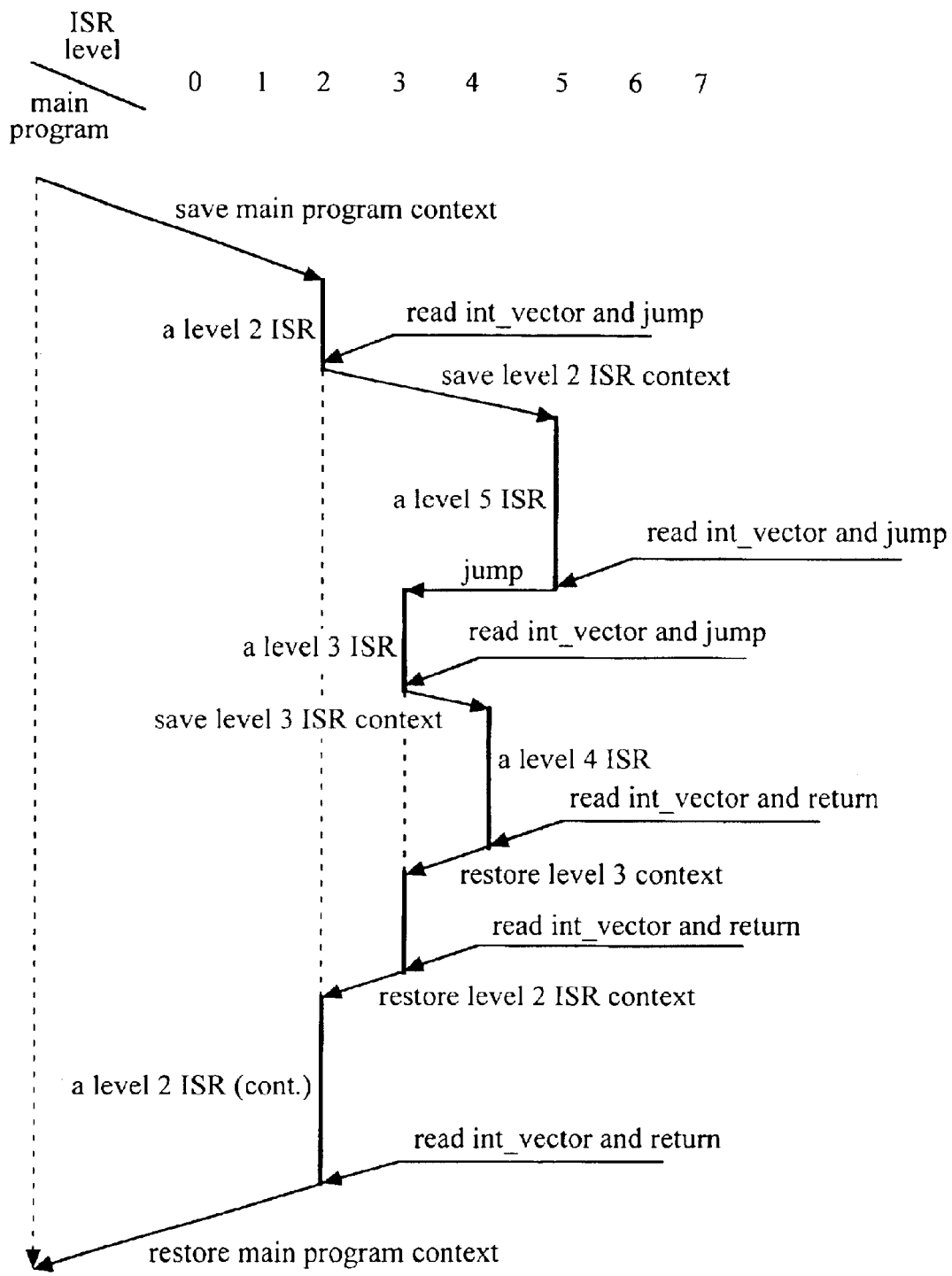
FIG. 9 is a graph illustrating exemplary processing of interrupt requests within a microprocessor connected to the interrupt controller of FIG. 4.
Figure 10:
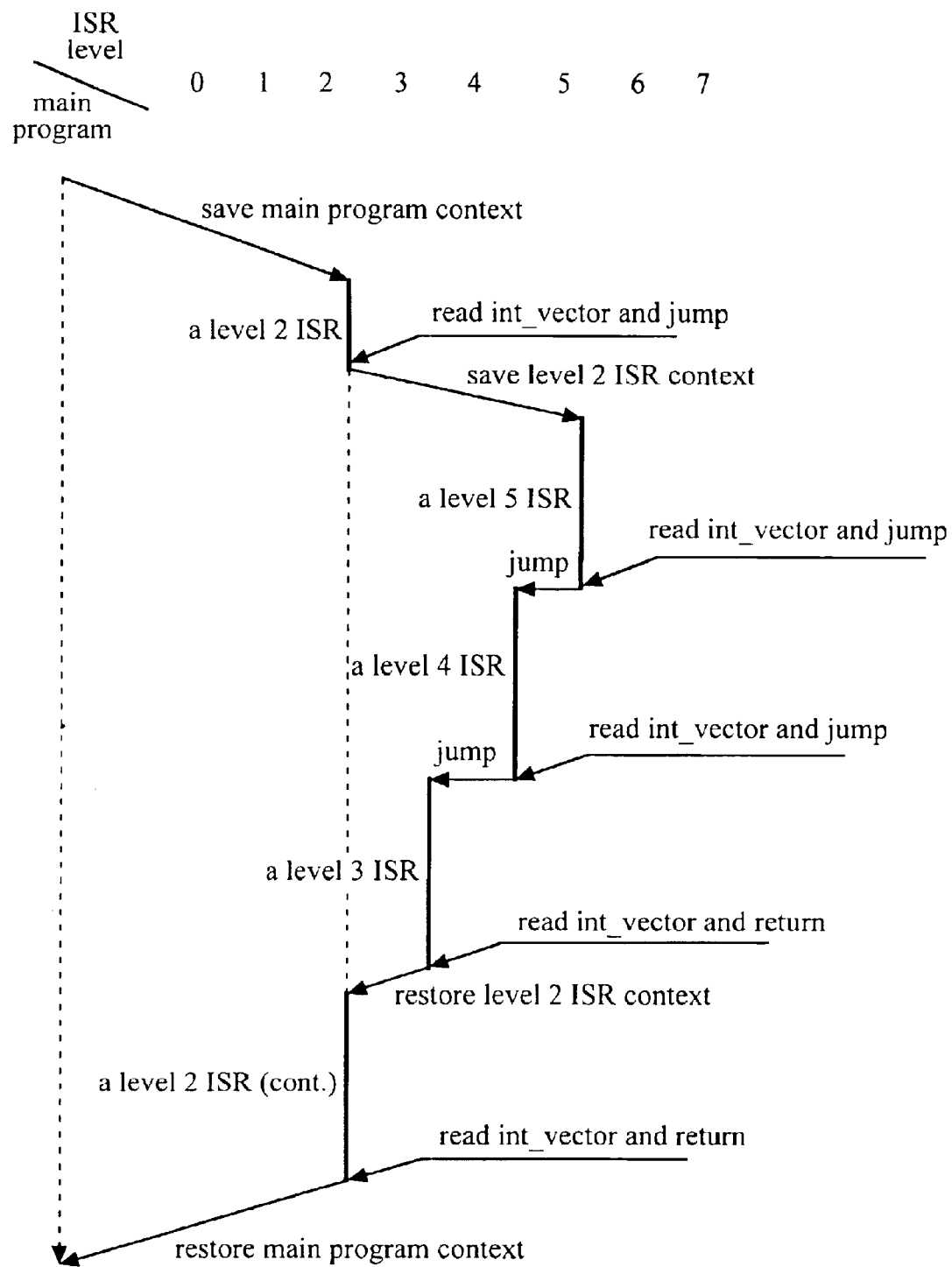
FIG. 10 is another graph illustrating the processing of interrupt requests by the microprocessor connected to the interrupt controller of FIG. 4.

With reference to the timing diagrams in FIGS. 9–10, when an IRQ is asserted, the microprocessor branches into the IRQ handler. The microprocessor next saves context, reads the interrupt vector index and jumps to the proper ISR jump-table location. At the end of each ISR, the microprocessor again reads the interrupt vector register. If a value of NON_VECTOR is detected, the microprocessor restores context and returns to the previously nested ISR. If the microprocessor detects a valid interrupt vector index, it throws away the context of the just-done ISR and jumps to the new ISR location. This process continues until all ISR are serviced. The timing diagram of FIG. 9 illustrates servicing of four ISRs (level 2, level 5, level 3, level 4) without unnecessary context switching as described above. An ISR of level 2 is first received which causes the main program context to be saved. The level 2 ISR is being serviced when a level 5 ISR is read from the INT_VECTOR whereupon the controller jumps to service the level 5 ISR and saves the level 2 ISR context. Upon the completion of the level 5 ISR servicing, the controller reads the INT_VECTOR and jumps to the next lowest pending ISR, a level 3 ISR, and services it. During the servicing of the level 3 ISR, a level 4 ISR is read from the INT_VECTOR causing the controller to save level 3 ISR context and begin servicing the level 4 ISR. When the servicing of the level 4 ISR is complete, the controller reads the INT_VECTOR and returns to servicing the level 3 ISR by restoring the level 3 context. When the servicing of the level 3 ISR is fully completed, the controller reads the INT_VECTOR and returns to the servicing of the level 2 ISR by restoring the level 2 ISR context. After the servicing of the previously nested level 2 ISR is fully completed, the controller reads the INT_VECTOR and returns to the main program by restoring the main program context.

A slight variation of the timing diagram of FIG. 9 is provided in FIG. 10 which illustrates the servicing of four ISRs (level 2, level 5, level 4, level 3) without unnecessary context switching. When a level 2 ISR is received by the controller, the main program is interrupted and its context saved before it is serviced. In this example, a level 5 ISR is received prior to the full servicing of the level 2 ISR. When the level 5 ISR is read in the INT_VECTOR with an accompanying jump command, the level 2 ISR context is save and the controller begins servicing the level 5 ISR. During the servicing of the level 5 ISR, a level 4 ISR and a level 3 ISR are received by the controller. Upon completion of the level 5 ISR servicing, the INT_VECTOR is read and the controller jumps to the next lowest pending ISR, a level 4 ISR. The level 4 ISR is serviced, the INT_VECTOR is read, and the controller jumps to service a level 3 ISR, the next lowest pending ISR. The level 3 ISR is serviced, the INT_VECTOR is read and since the next lowest pending ISR, the level 2 ISR was nested, a return command restores the level 2 ISR context. The level 2 ISR is then fully serviced and the INT_VECTOR is serviced and because there are no pending ISRs of any level, a return command restores the main program context and the main program resumes operation.

Figure 11:
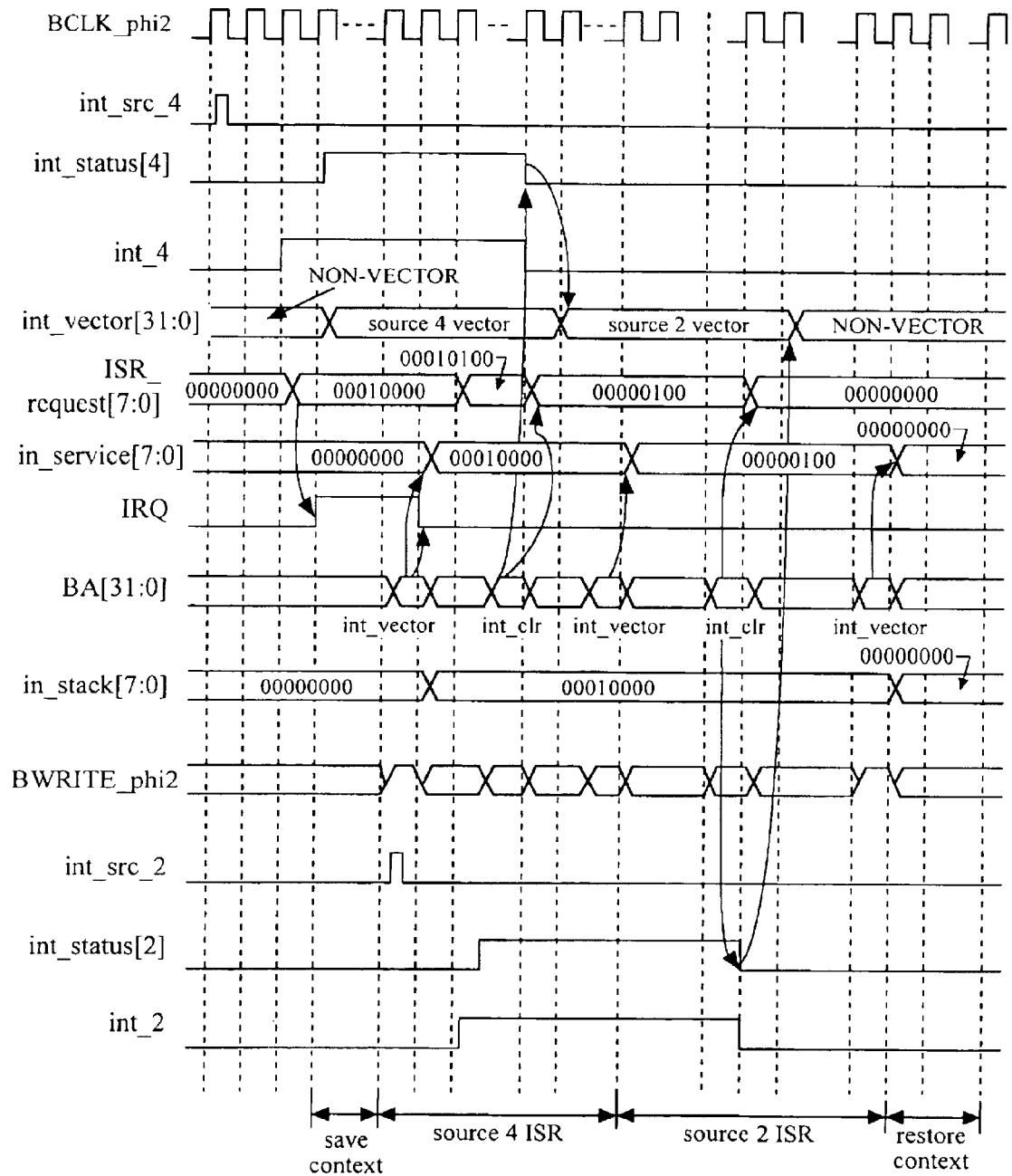
FIG. 11 is a timing diagram illustrating the timing of selected signals generated within the interrupt controller of FIG. 4 wherein an interrupt request having a priority level of two is received following receipt of an interrupt request having a priority level of four.
Figure 12:
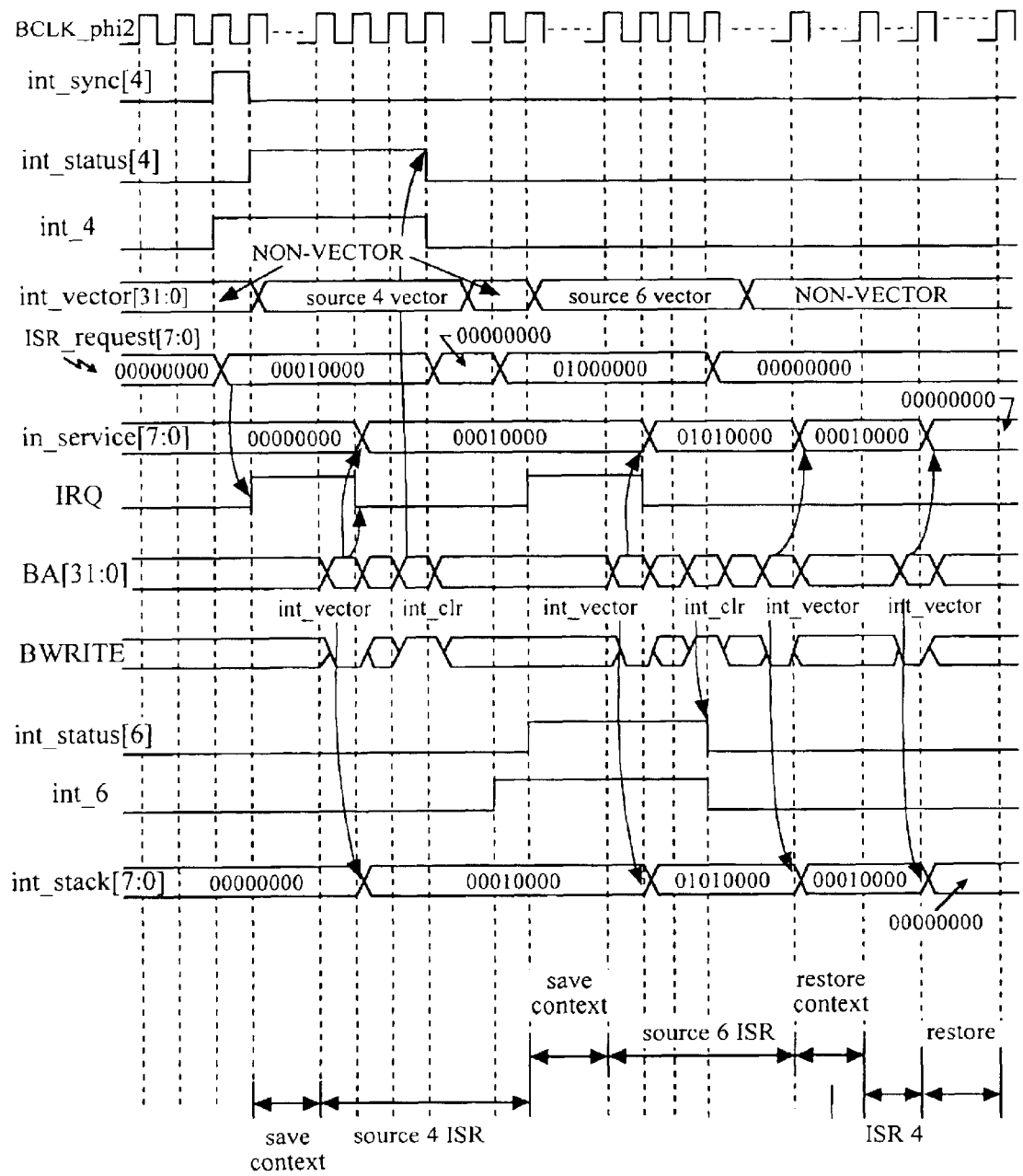
FIG. 12 is a timing diagram illustrating selected signals generated within the interrupt controller of FIG. 4 for an example wherein an interrupt request having a priority level of six is received following an interrupt request having a priority level of four.
Figure 13:
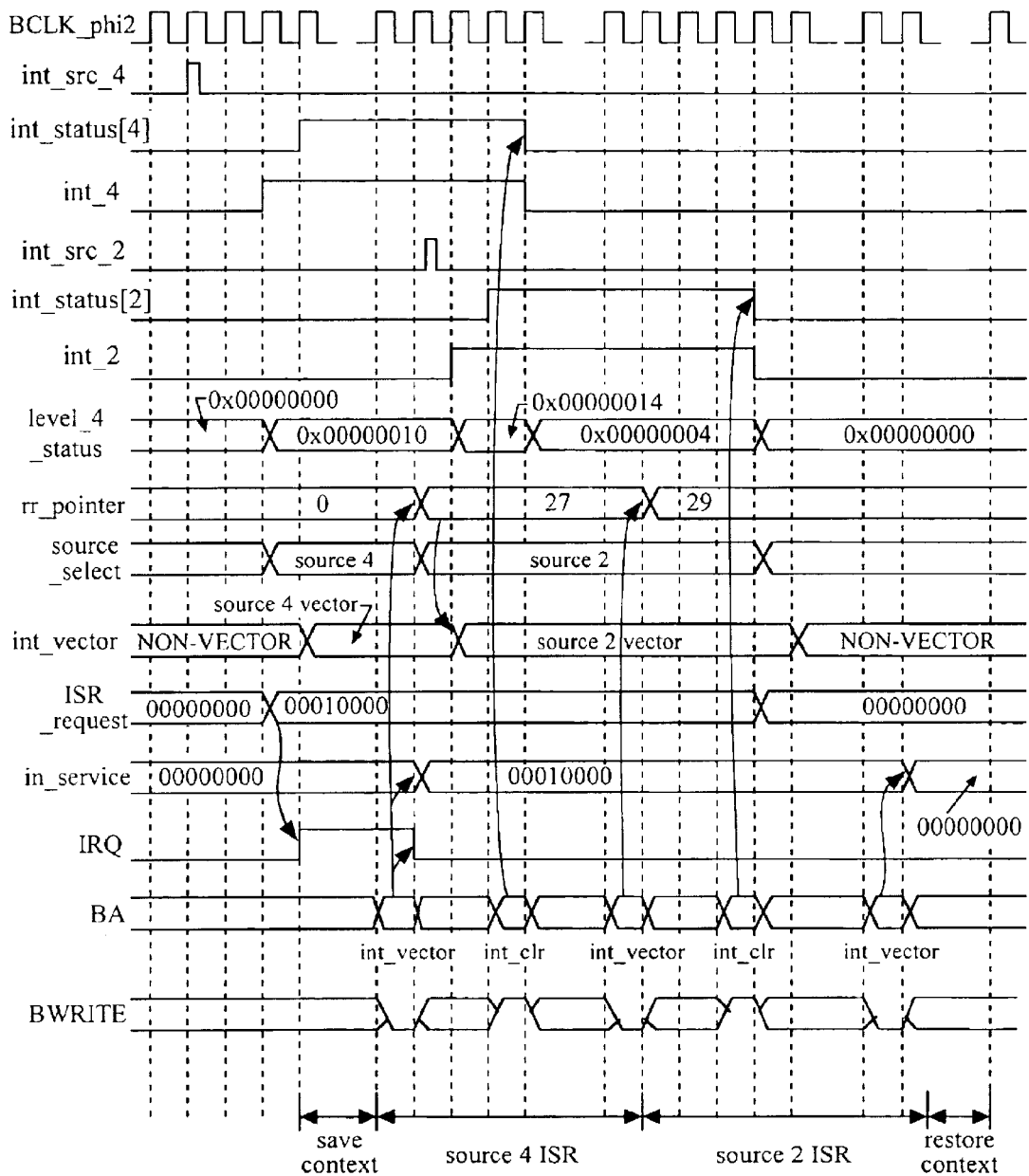
FIG. 13 is a timing diagram of selected signals generated by the interrupt controller of FIG. 4 for an example wherein two interrupt requests of equal priority are received one after the other.

FIG. 11 is a signal timing diagram where an interrupt service routine of priority level 4 is followed by an interrupt service routine of priority level 2 from the initial pulse of the ISRs until context is restored. FIG. 12 is a signal timing diagram where an interrupt service routine of priority level 4 is followed by an interrupt service routine of priority level 6. The ISR of priority level 6 asserts IRQ before the priority level 4 ISR is fully serviced thereby nesting the IST in the microprocessor. FIG. 13 is a signal timing diagram where two interrupt service routines from two different sources are both at priority level 4.

Figure 14:
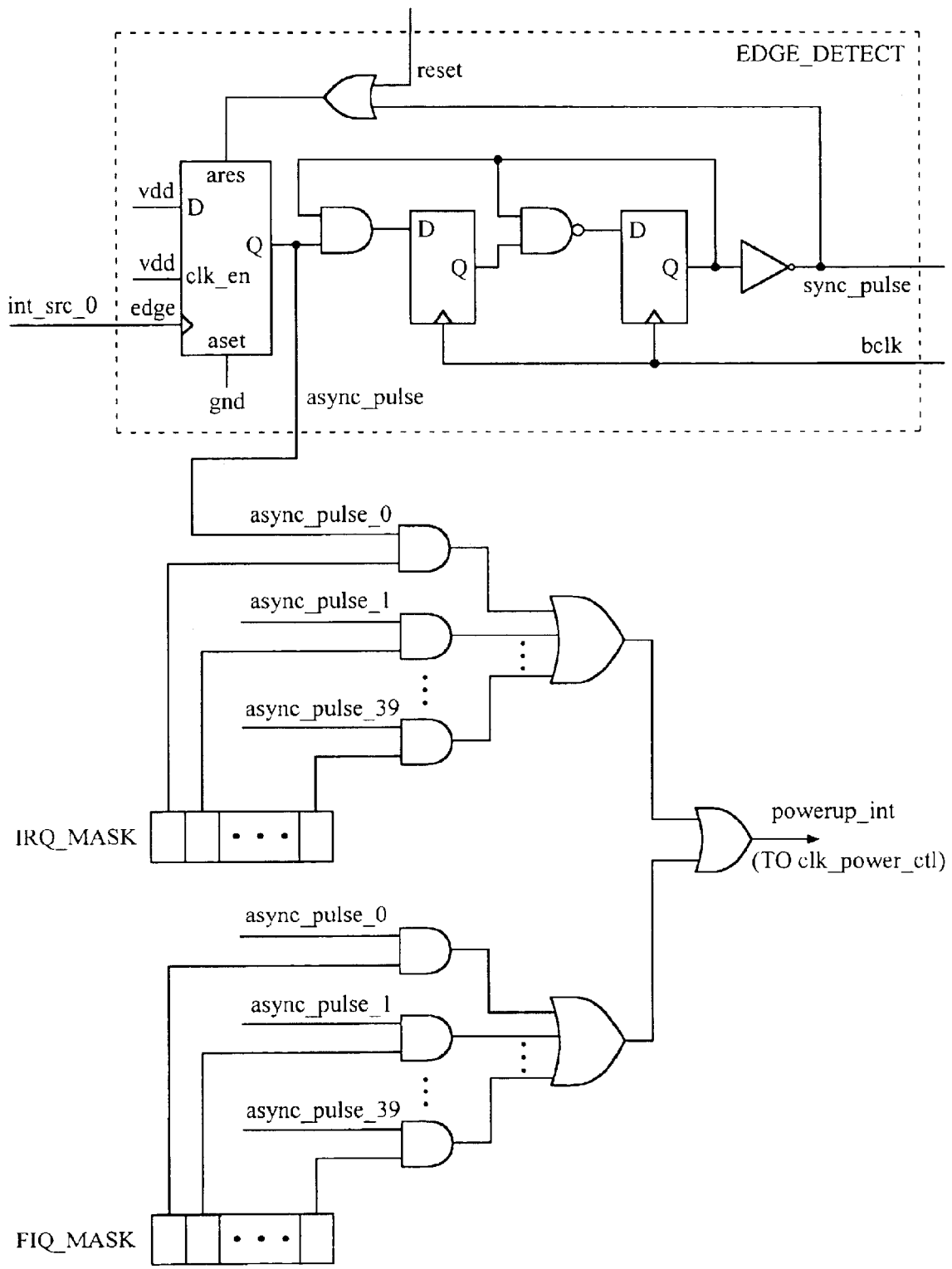
FIG. 14 illustrates pertinent circuit components of the priority controller of FIG. 4 for use in generating a power up interrupt signal for transmitting to a microprocessor connected to the interrupt controller.

FIG. 14 illustrates the logic for an edge detector used for the generation of a power-down mode interrupt signal (powerup_int) output by the interrupt controller of FIG. 6. The IRQ/FIQ generation is synchronized to the BCLK clock. Hence, the clock and power unit operating the overall system cannot directly send a IRQ/FIQ signal to exit the microprocessor power-down or sleep mode. An asynchronous pulse is captured from interrupt sources (async_pulse_0 to async_pulse_39) and is used to signal the processor to exit the power-down mode. The corresponding IRQ/FIQ masks are used to specify which interrupts are allowed to cause the microprocessor to power-down.

While a particular form of the invention has been illustrates and described, it will be apparent that various modifications can be made without departing from the spirit and scope of the invention. Accordingly, it is not intended that the invention be limited, except as by the appended claims.

What is claimed is:

1. A system for use in a mobile communications device, said system comprising:
   a microprocessor having components for responding to interrupt requests by interrupting current processing and performing an interrupt service routine associated with the interrupt request;
   peripheral processing units having components for generating interrupt requests for sending to the microprocessor; and .
   an interrupt controller having components for receiving interrupt requests directed to the microprocessor from the peripheral processing units and for prioritizing the interrupt requests on behalf of the microprocessor,
   wherein said interrupt controller includes:
      an interrupt source interface unit for receiving interrupt requests directed to the microprocessor from the peripheral processing units;
      an interrupt prioritization unit for identifying an interrupt request of highest priority from among the interrupt requests received; and
      a microprocessor notification unit for notifying the microprocessor of the interrupt request of highest priority,
   wherein said microprocessor notification unit includes:
      an interrupt staging unit for storing a value representative of the interrupt request of highest priority; and
      an interrupt transmission unit for transmitting a notification signal the microprocessor indicating that a new interrupt request is stored in the interrupt storage means, and
   wherein the microprocessor includes:
      an interrupt notification signal reception unit;
      interrupt access unit for reading the value representative of the new interrupt request stored within the interrupt staging unit;
      a context storage unit for saving a current context of the microprocessor;
      an interrupt stack controller for determining whether a current interrupt service routine is being executed, and, if so, for storing the interrupt request associated therewith in an interrupt stack: and
      an interrupt service routine execution unit for executing an interrupt service routine associated with the new interrupt request value read from the interrupt staging unit, wherein the interrupt service routine execution unit also detects completion of the interrupt service routine, determines whether the interrupt staging unit contains another value representative of an interrupt request and, if so, executes an interrupt service routine associated with the interrupt request value read from the interrupt staging unit and, if not, retrieves an interrupt request, if any, stored at the top of the interrupt stack and the context saved in the context storage unit and resumes execution based upon that context..

2. The system of claim 1, wherein the interrupt staging unit is an interrupt vector register.

3. The system of claim 1, wherein the notification signal is an IRQ signal.

4. The system of claim 1, wherein the interrupt controller also includes:
   an interrupt service routine tracking unit for tracking the priority level associated with the interrupt request, if any, currently being processed by the microprocessor,
   an interrupt stack tracking unit for tracking the priority level associated with the interrupt request, if any, stored at the top of the interrupt stack of the microprocessor, and
   a control unit for:

controlling said interrupt notification unit to store the value representative of the interrupt request of highest priority received by the interrupt controller in the interrupt staging unit only if the priority level associated therewith is higher than the priority level associated with the interrupt request, if any, stored at the top of the interrupt stack of the microprocessor, and controlling said interrupt transmission unit to transmit the notification signal only if the priority associated therewith is higher than the priority level associated with the interrupt request, if any, currently being processed by the microprocessor.

5. The system of claim 4, wherein said interrupt service routine tracking unit additionally tracks the priority levels of other interrupt requests, if any, stored within the interrupt stack of the microprocessor.

6. The system of claim 5, wherein the interrupt service routine tracking unit detects whether the interrupt staging unit contains an interrupt request when the interrupt access unit of the microprocessor accesses the interrupt staging unit and, if so, resets the highest priority level tracked in the interrupt service routine tracking unit to the highest priority level currently tracked by the interrupt stack tracking unit and, if not, eliminates the highest priority level tracked in the interrupt service routine tracking unit.

7. The system of claim 4, wherein said interrupt service routine tracking unit additionally tracks the priority levels associated with interrupt requests, if any, previously retrieved by the microprocessor but not yet fully processed.

8. The system of claim 7, wherein the interrupt service routine racking unit detects whether the interrupt staging unit contains an interrupt request when the interrupt access unit accesses the interrupt staging unit and, if so, resets the highest priority level tracked in the interrupt service routine tracking unit to the priority level of the interrupt request stored in the interrupt request storage unit and, if not, eliminates the highest priority level tracked in the interrupt service routine tracking unit.

9. The system of claim 5, wherein said interrupt stack tracking unit includes an $IN_{13}$ STACK register having at least one bit for each priority level.

10. A The system of claim 7, wherein said interrupt service routine tracking means includes an IN_SERVICE register having at least one bit for each priority level.

11. The system of claim 1, wherein said interrupt prioritization unit determines a relative priority of interrupt requests from among a plurality of priority levels.

12. The system of claim 11, wherein said interrupt source interface unit is connected to a plurality of individual interrupt lines, each currying a separate interrupt request, and wherein said interrupt prioritization unit includes prioritization registers maintaining a predetermined priority level associated with each of said individual interrupt lines and a plurality of interrupt level slice units associating the predetermined priority level with the received interrupt request based upon the interrupt request line upon which the interrupt is received.

13. The system of claim 12, wherein a plurality of said interrupt level slice units are provided, one per respective priority level, each receiving a value representative of all interrupt requests and outputting a value representative of only those interrupt requests having the respective priority level.

14. The system of claim 12, wherein said interrupt prioritization unit includes round-robin selection unit for selecting one interrupt among a group of interrupts of each priority.

15. The system of claim 1, wherein the microprocessor includes a power control unit and wherein the interrupt controller additionally includes a power up initiation unit for identifying received interrupt requests authorized to trigger powering up of the microprocessor and for triggering the power control unit to power up the microprocessor in response to receipt of one of said requests.

16. The system of claim 1, wherein said interrupt prioritization unit distinguishes between IRQ and FIQ requests and wherein interrupt notification unit notifies the microprocessor of FIQ requests immediately and independently of IRQ requests.

17. A system for use in a mobile communications device, said system comprising:

a microprocessor having components for responding to interrupt requests by interrupting current processing and performing an interrupt service routine associated with the interrupt request;

peripheral processing units having components for generating interrupt requests for sending to the microprocessor; and an interrupt controller having:
means for receiving interrupt requests directed to the microprocessor, said interrupt request requesting the microprocessor to interrupt current processing and perform an interrupt service routine associated with the interrupt request;
means for identifying an interrupt request of highest priority from among the interrupt requests received; and
means for notifying the microprocessor of the interrupt request of highest priority,
wherein said means for notifying the microprocessor includes:
interrupt storage means for storing a value representative of the interrupt request of highest priority; and
means for transmitting a notification signal to the microprocessor indicating that a new interrupt request is stored in the interrupt storage means, wherein the microprocessor includes:
means for receiving the notification signal;
interrupt access means for reading the value representative of the new interrupt request stored within the interrupt storage means;
means for saving a current context of the microprocessor;
means for determining whether a current interrupt service routine is being executed and, if so, for storing the interrupt request associated therewith in an interrupt stack;
means for executing an interrupt service routine associated with the new interrupt request value read form the interrupt storage means;
means for detecting completion of the interrupt service routine; and means for determining whether the interrupt storage means of the interrupt controller contains another value representative of an interrupt request and, if so, for executing an interrupt service routine associated with the interrupt request value read from the interrupt storage means and, if not, for retrieving an interrupt request, if any, stored at the top of the interrupt stack and the context saved in the means for saving a current context and for resuming execution based upon that context.

18. The system of claim 17, wherein the interrupt controller farther includes:

interrupt service routine tracking means for tracking the priority level associated with the interrupt request, if any, currently being processed by the microprocessor;

interrupt stack tracking means for tracking the priority level associated with the interrupt request, if any, stored at the top of the interrupt stack of the microprocessor;

means for controlling said means for notifying the microprocessor to store the value representative of the interrupt request of highest priority received by the interrupt controller in the interrupt storage means only if the priority level associated therewith is higher than the priority level associated with the interrupt request, if any, stored at the top of the interrupt stack of the microprocessor; and means for controlling said means for transmitting a notification signal to the microprocessor to transmit the notification signal only if the priority associated therewith is higher than the priority level associated with the interrupt request, if any, currently being processed by the microprocessor.

19. The system of claim 18, wherein said interrupt service routine tracking means additionally tracks the priority levels of other interrupt requests, if any, stored within the interrupt stack of the microprocessor.

20. The system of claim 19, wherein the interrupt service routine tracking means includes means for detecting whether the interrupt storage means contains an interrupt request when the interrupt access means accesses the interrupt storage means and, if so, for resetting the highest priority level tracked in the interrupt service routine tracking means to the highest priority level currently tracked by the interrupt stack tracking means and, if not, for eliminating the highest priority level tracked in the interrupt service routine tracking means.

21. The system of claim 18, wherein said interrupt service routine tracking means additionally tracks the priority levels associated with interrupt request, if any, previously retrieved by the microprocessor but not yet fully processed.

22. The system of claim 21, wherein the interrupt service routine tracking means includes means for detecting whether the interrupt storage means contains an interrupt request when the interrupt access means accesses the interrupt storage means and, if so, for resetting the highest priority level tracked in the interrupt service routine tracking means to the priority level of the interrupt request stored in the interrupt request storage means and, if not, for eliminating the highest priority level tracked in the interrupt service routine tracking means.

23. The system of claim 19, wherein said interrupt stack tracking means includes a register having at least one bit for each priority level.

24. The system of claim 21, wherein said interrupt service routine tracking means includes a register having at least one bit for each priority level.

25. The system of claim 17, wherein said means for identifying an interrupt request of highest priority from among the interrupt requests received includes means for determining a relative priority of interrupt requests from among a plurality of priority levels.

26. The system of claim 25, wherein said means for receiving interrupt requests directed to the microprocessor is connected to a plurality of individual interrupt lines, each carrying a separate interrupt request, and wherein said means for determining the priority relative priority of interrupt requests from among a plurality of priority levels includes means for maintaining a predetermined priority level associated with each of said individual interrupt lines and means associating the predetermined priority level with the received interrupt request based upon the interrupt request line upon which the interrupt is received.

27. The system of claim 26, wherein said means for associating the predetermined priority level with the received interrupt request based upon the interrupt request line upon which the interrupt is received includes a plurality of interrupt level slice means, one per respective priority level, each for receiving a value representative of all interrupt requests and outputting a value representative of only those interrupt requests having the respective priority level.

28. The system of claim 26, wherein said means for identifying an interrupt request of highest priority from among the interrupt requests includes means for selecting on interrupts from among a group of interrupts of equal priority.

29. The system of claim 28, wherein the means for selecting one of the interrupts of equal priority is a round-robin selection unit.

30. The system of claim 17, wherein the microprocessor includes means for entering a power shut down mode and wherein the interrupt controller additionally includes means for identifying received interrupt request authorized to trigger powering up of the microprocessor and means for powering up the microprocessor in response to receipt of one of said requests.

31. The system of claim 17, wherein said means for identifying an interrupt request of highest priority from among the interrupt requests received includes means for distinguishing between IRQ and FIQ requests, and wherein said means for notifying the microprocessor of the interrupt request of highest priority notifies the microprocessor of FIQ requests immediately and independently of IRQ requests.

32. A method for use with an interrupt controller and a microprocessor within a mobile communications device, said microprocessor including components for responding to interrupt requests by interrupting current processing and performing an interrupt service routine associated with the interrupt request, said method comprising the steps of:

receiving interrupt requests directed to the microprocessor using the interrupt controller;

identifying an interrupt request of highest priority from among the interrupt requests received, using the interrupt controller;

notifying the microprocessor of the interrupt request of highest priority in storing a value representative of the interrupt request of highest priority in an interrupt storage device;

transmitting a notification signal to the microprocessor indicating chat a new interrupt request is stored in the interrupt storage means;

receiving the notification signal;

reading the value representative of the new interrupt request stored within the interrupt storage device;

saving a current context of the microprocessor;

determining whether a current interrupt service routine is being executed and, if so, storing the interrupt request associated therewith in an interrupt stack;

executing an interrupt service routine associated with the new interrupt request value read from the interrupt storage device;

determining completion of the interrupt service routine; and determining whether the interrupt storage device of the interrupt controller contains another value representative of an interrupt request and, if so, executing an interrupt service routine associated with the interrupt request value read from the interrupt storage device and, if not, retrieving an interrupt request, if any, stored at the top of the interrupt stack and the context associated therewith and resuming execution based upon that context.

33. The method of claim 32, further including the steps performed by the interrupt controller of:

tracking the priority level associated with the interrupt request, if any, currently being processed by the microprocessor within an interrupt service routine tracking device;

trucking the priority level associated with the interrupt request, if any, stored at the cop of the interrupt slack of the microprocessor with an interrupt stack tracking device;

storing the value representative of the interrupt request of highest priority received by the interrupt controller in the interrupt storage device only if the priority level associated therewith is higher than the priority level associated with the interrupt request, if any, stored at the top of the interrupt stack of the microprocessor, and transmitting the notification signal to the microprocessor only if the priority associated therewith is higher than the priority level associated with the interrupt request, if any, currently being processed by the microprocessor.

34. The method of claim 33, wherein further including the step of tracking the priority levels of other interrupt requests, if any, stored within the interrupt stack of the microprocessor.

35. The method of claim 34, wherein the stop tracking interrupt service routines includes the steps of detecting whether the interrupt storage device contains an interrupt request when accessed by the microprocessor and, if so, resetting the highest priority level tracked in the interrupt service routine tracking device to the highest priority level currently tracked by the interrupt stack tracking device and, if not, for eliminating the highest priority level tracked in the interrupt service routine tracking device.

36. The method of claim 33, further including the step of tracking the priority levels associated with interrupt requests, if any, previously retrieved by the microprocessor but not yet fully processed.

37. The method of claim 36, wherein the step of tracking interrupt requests currently being processed by the microprocessor includes the step of detecting whether the interrupt storage device contains an interrupt request when the interrupt access device is accessed by the microprocessor and if so, resetting the highest priority level tracked in the interrupt service routine tracking device to the priority level of the interrupt request stored in the interrupt request storage device and, if not, eliminating the highest priority level tracked in the interrupt service routine tracking device.

38. The method of claim 32, wherein said step of identifying an interrupt request of highest priority from among the interrupt requests received includes the step of determining a relative priority of interrupt requests from among a plurality of priority levels.

39. The method of claim 38, wherein said step of receiving interrupt requests directed to the microprocessor includes the step of receiving signal simultaneously from a plurality of individual interrupt lines, each carrying a separate interrupt request, and wherein said step of determining the priority relative priority of interrupt requests from among a plurality of priority levels includes the steps of maintaining a predetermined priority level associated with each of said individual interrupt lines and associating the predetermined priority level with the received interrupt request based upon the interrupt request line upon which the interrupt is received.

40. The method of claim 39, wherein said step of associating the predetermined priority level with the received interrupt request based upon the interrupt request line upon which the interrupt is received includes the step of routing the signals through a plurality of interrupt level slice units, one per respective priority level, each for receiving a value representative of all interrupt requests and outputting a value representative of only those interrupt requests having the respective priority level.

41. The method of claim 39, wherein if there are more than one pending interrupt requests of equal priority, said step of identifying an interrupt request of highest priority from among the interrupt requests includes the step of selecting one of the interrupts of equal priority via a round-robin selection process.

42. The method of claim 32, wherein the microprocessor additionally performs the step of entering a power shut down mode and wherein the interrupt controller additionally performs the step of identifying received interrupt requests authorized to trigger powering up of the microprocessor and powering up the microprocessor in response to receipt of one of said requests.

43. The method of claim 32, wherein step of identifying an interrupt request of highest priority from among the interrupt requests received includes the step of distinguishing between IRQ and FIQ requests and wherein said step of notifying the microprocessor of the interrupt request of highest priority is performed to notify the microprocessor of FIQ requests immediately and independently of IRQ requests.

\* \* \* \* \*